US011225922B2

(12) United States Patent
Lawenius et al.

(10) Patent No.: US 11,225,922 B2
(45) Date of Patent: Jan. 18, 2022

(54) TWO-STROKE ENGINE CONTROL

(71) Applicant: HUSQVARNA AB, Huskvarna (SE)

(72) Inventors: Mats Lawenius, Gothenburg (SE); Bo Carlsson, Alingsås (SE)

(73) Assignee: Husqvarna AB, Huskvarna (SE)

( * ) Notice: Subject to any disclaimer, the term of this patent is extended or adjusted under 35 U.S.C. 154(b) by 0 days.

(21) Appl. No.: 17/124,110

(22) Filed: Dec. 16, 2020

(65) Prior Publication Data
US 2021/0180531 A1 Jun. 17, 2021

Related U.S. Application Data

(63) Continuation of application No. 17/251,979, filed as application No. PCT/SE2019/050634 on Jun. 27, 2019.

(51) Int. Cl.
F02D 41/08 (2006.01)
F02D 41/02 (2006.01)
(Continued)

(52) U.S. Cl.
CPC .......... *F02D 41/022* (2013.01); *B23D 47/12* (2013.01); *F02D 41/08* (2013.01); *F02B 63/02* (2013.01);
(Continued)

(58) Field of Classification Search
CPC ............ F02D 2400/04; F02D 2400/06; F02D 2200/101; F02D 41/022; F02D 41/08; F02B 63/02
See application file for complete search history.

(56) References Cited

U.S. PATENT DOCUMENTS 3,982,616 A * 9/1976 Bidanset .............. B27B 17/083
192/104 C
4,588,167 A * 5/1986 Finzel ...................... B66D 1/00
254/346
(Continued)

FOREIGN PATENT DOCUMENTS

DE 3628456 A1 3/1988
EP 2891785 A1 7/2015
(Continued)

OTHER PUBLICATIONS

International Search Report and Written Opinion for International Application No. PCT/SE2018/050785 dated Apr. 8, 2019.
(Continued)

*Primary Examiner* — Thomas N Moulis
(74) *Attorney, Agent, or Firm* — Burr & Forman, LLP

(57) ABSTRACT

A two-stroke combustion engine comprising a user-operated throttle control, an adjustable valve arranged to control one or more air intakes of the combustion engine, and a control unit arranged to control a state of the adjustable valve, wherein the combustion engine is arranged to operate in a first idle mode at an idle engine speed below a clutch engagement engine speed when the user-operated throttle control is not engaged, wherein the combustion engine is arranged to operate in a second idle mode at a target engine speed above the clutch engagement engine speed when the user-operated throttle control is engaged and when the engine is not subject to an external load, the control unit being arranged to control the state of the adjustable valve to maintain engine speed at the target engine speed when the engine operates in the second idle mode.

25 Claims, 9 Drawing Sheets

(51) Int. Cl.
*B23D 47/12* (2006.01)
*F02B 63/02* (2006.01)
*F02D 9/02* (2006.01)

(52) U.S. Cl.
CPC ............... *F02D 2009/0208* (2013.01); *F02D 2009/0272* (2013.01); *F02D 2009/0279* (2013.01); *F02D 2200/0404* (2013.01); *F02D 2200/101* (2013.01); *F02D 2400/04* (2013.01); *F02D 2400/06* (2013.01)

(56) References Cited

U.S. PATENT DOCUMENTS

| | | | |
|---|---|---|---|
| 5,377,650 A * | 1/1995 | Warner | F02M 26/21 123/568.29 |
| 5,445,014 A | 8/1995 | Fiorenza, II et al. | |
| 9,103,289 B2 | 8/2015 | Gwosdz | |
| 9,109,569 B2 | 8/2015 | Kunert et al. | |
| 9,726,095 B2 | 8/2017 | Yoshizaki et al. | |
| 9,797,319 B2 | 10/2017 | Dangelmaier et al. | |
| 9,873,193 B2 | 1/2018 | Gorenflo et al. | |
| 10,590,869 B2 | 3/2020 | Axelsson et al. | |
| 10,641,195 B2 * | 5/2020 | Barbolini | F02P 9/005 |
| 2006/0086337 A1 | 4/2006 | Nickel | |
| 2009/0093340 A1 * | 4/2009 | Higaki | B60W 30/18045 477/109 |
| 2010/0145595 A1 * | 6/2010 | Bellistri | F02D 31/007 701/103 |
| 2010/0258099 A1 * | 10/2010 | Andersson | F02D 41/1446 123/676 |
| 2011/0107985 A1 | 5/2011 | Gorenflo et al. | |
| 2011/0203272 A1 * | 8/2011 | Nedorezov | F02P 5/1502 60/611 |
| 2013/0228153 A1 * | 9/2013 | Hoff | F02D 9/02 123/339.13 |
| 2015/0298700 A1 | 10/2015 | Kuroki et al. | |
| 2015/0315982 A1 * | 11/2015 | Koenen | F02D 9/1065 123/350 |
| 2016/0305348 A1 | 10/2016 | Gangler et al. | |
| 2017/0009634 A1 * | 1/2017 | Shiomi | F02D 41/025 |
| 2018/0281805 A1 * | 10/2018 | Dudar | B60W 10/06 |
| 2019/0293046 A1 | 9/2019 | Andersson et al. | |

FOREIGN PATENT DOCUMENTS

| | | |
|---|---|---|
| JP | 606024 A | 1/1985 |
| JP | 2013024227 A | 2/2013 |

OTHER PUBLICATIONS

International Search Report and Written Opinion for International Application No. PCT/SE2019/050634 dated Sep. 4, 2019.

* cited by examiner

TWO-STROKE ENGINE CONTROL

TECHNICAL FIELD

The present disclosure relates to a two-stroke combustion engine comprising a user-operated throttle control and an adjustable valve arranged to control an air intake of the combustion engine. The disclosure also relates to power tools comprising the combustion engine and to related methods and computer programs.

BACKGROUND

Two-stroke engines are often used in handheld power tools and the like where a high power-to-weight ratio is desired. Such two-stroke engines are often optimized for operation at full load and with wide open throttle (WOT). For instance, the scavenging system of the engine is often optimized for operation at high engine speeds and full load. As long as the engine operates close to the ideal operating point for which it was optimized, misfiring, high temperatures, and high emissions are avoided. However, if the engine is operating far from the ideal operating point, sub-optimal engine performance can be expected, and even engine failure.

If a user engages a user operated throttle control of a two-stroke engine without also subjecting the engine to an external load, then the engine speed will increase up to dangerous racing speed levels. To avoid racing combustion engines, it is common to cut engine ignition when the engine speed passes some maximum engine speed. However, by cutting ignitions an increased amount of unburnt fuel results, thus increasing engine emissions, which is a problem.

US 2014/0060507 discusses two-stroke engine control for avoiding rush conditions.

SUMMARY

It is an object of the present disclosure to provide combustion engines, power tools, and methods which alleviate at least some of the problems mentioned above.

This object is obtained by a two-stroke combustion engine comprising a user-operated throttle control, an adjustable valve arranged to control one or more air intakes of the combustion engine, and a control unit arranged to control a state of the adjustable valve. The combustion engine is arranged to operate in a first idle mode at an idle engine speed below a clutch engagement engine speed when the user-operated throttle control is not engaged. The combustion engine is also arranged to operate in a second idle mode at a target engine speed above the clutch engagement engine speed when the user-operated throttle control is engaged and when the engine is not subject to an external load. The control unit is arranged to control the state of the adjustable valve to maintain engine speed at the target engine speed when the engine operates in the second idle mode.

This way the combustion engine avoids operating at too high speeds, by operating in the second idle mode when the user operated throttle control is engaged but the engine is not subject to an external load. Thus, problems associated with unwanted emission due to cutting ignition are reduced.

According to aspects, the control unit is arranged to determine an unwanted operating zone comprising a range of adjustable valve states in dependence of an engine speed value, and to control the state of the adjustable valve to be outside of the unwanted operating zone.

The unwanted operating zone corresponds to operating conditions for which the two-stroke combustion engine has not been optimized. For instance, a scavenging operation of the combustion engine may not function properly when the engine operates in the unwanted operating zone, which can lead to high temperatures and misfires. By controlling the state of the adjustable valve such that the engine operates outside of the unwanted operating zone, problems related to sub-optimal scavenging of the engine are avoided.

According to aspects, the control unit is arranged to determine the unwanted operating zone based on engine torque resulting from a combination of engine speed value and engine throttle angle, wherein the unwanted operating zone corresponds to sub-optimal engine scavenging operation. It is an advantage that the unwanted operating zone can be determined based on two parameters, engine speed value and engine throttle angle, which are readily available.

According to some aspects, the control unit is arranged to determine a plurality of unwanted operating zones, such as a first, a second, and a third unwanted operating zone.

According to aspects, the control unit is arranged to control the state of the adjustable valve by increasing an opening of the adjustable valve by a first amount if the engine speed is below the target engine speed, and by decreasing an opening of the adjustable valve by a second amount if the engine speed is above the target engine speed, wherein the first and second amounts are determined to control the state of the adjustable valve to be outside of the unwanted operating zone. This way the adjustable valve is used to control engine speed to be close to the target engine speed, while avoiding operation in the unwanted operating zone. The proposed control unit is of low complexity, implementing increases and decreases as function of engine speed, which is an advantage.

According to aspects, the control unit is arranged to determine the unwanted operating zone in dependence of a temperature value of the combustion engine. By determining the unwanted operating zone in dependence of a temperature value of the combustion engine, the unwanted operating zone can be adjusted according to present engine drive conditions, which is an advantage. For instance, the unwanted operating zone may be larger in case the engine is close to overheating, requiring larger operating margins, while the unwanted operating zone can be made smaller in case the engine is far from overheating, requiring smaller operating margins.

According to aspects, the control unit is arranged to determine the unwanted operating zone in dependence of a user profile associated with the combustion engine. Some users can be expected to operate the engine more aggressively than other users. Also, some users more often subject the engine to high levels of stress by, e.g., aggressively varying a load of the engine. Advantageously, such varying user characteristics can be accounted for by determining the unwanted operating zone in dependence of a user profile associated with a user who is currently operating the engine.

According to aspects, the target engine speed is a function of the state of the adjustable valve. This means that the engine will strive for different target engine speeds depending on the operating scenario in which the engine is currently operating. For instance, it may be advantageous that the control unit maximizes the target engine speed to be close to a maximum engine speed when the engine is subjected to an external load, and cuts back on the target engine speed when the engine operates in the second idle mode, i.e., when the engine is not subject to any significant external load. This way the engine performance is maximized when the engine is loaded, while noise and fuel consumption is reduced when the engine is not loaded. According to another example, it may be advantageous that the control unit controls the engine to operate close to an engine speed associated with maximum torque when the engine is subject to an external load, and, at the same time controls the engine target speed such that maximum inertia is stored when the engine is not subject to external load.

According to aspects, the control unit is arranged to determine the unwanted operating zone comprising the range of adjustable valve states in dependence of a sensor input signal related to an operating condition of the two-stroke combustion engine. Thus, advantageously, the unwanted operating zone may be determined or adjusted as the engine is used for its intended purpose. This way the unwanted operating zone can be customized depending on how the engine is used, which is an advantage. Advantageously, the unwanted operating zone does not need to be pre-configured or at least does not need to be pre-configured at high precision, since it can be determined during use of the combustion engine.

According to aspects, the control unit is arranged to control the state of the adjustable valve to limit engine speed to speeds below a configured maximum engine speed. This way of limiting engine speed to avoid an engine racing condition does not necessarily comprise cutting ignition and is therefore not associated with the problems related to increased emission levels mentioned above, which is an advantage.

According to aspects, the state of the adjustable valve is a binary state comprising an open state and a closed state. Such binary state valves can be implement in a cost-efficient manner, providing for a low-cost implementation, which is an advantage.

According to aspects, the state of the adjustable valve comprises a continuous range of configurable air flow levels between a fully closed state and a fully open state. This type of continuous control provides for increased precision and a more refined engine air intake control. The continuous control can be combined with the binary state control. For instance, the control unit may apply continuous control within some operating range, and binary control within some other operating range of the combustion engine.

According to aspects, the control unit is arranged to control the state of the adjustable valve by temporarily decreasing the opening of the adjustable valve by a third amount when the combustion engine accelerates past the clutch engagement engine speed, thereby allowing a clutch operation of the two-stroke combustion engine to complete at a temporarily reduced engine torque.

This reduces wear on a clutch arrangement used together with the combustion engine, which is an advantage.

There are also disclosed herein power tools comprising the two-stroke combustion engine.

In particular, there is disclosed herein a power tool, comprising a combustion engine arranged to power a cutting disc, wherein an inertia of the cutting disc exceeds an internal inertia of the combustion engine, thereby allowing a time limited cutting operation by the cutting disc starting from a state corresponding to the target engine speed without combustion engine drive.

Advantageously, the cutting disc functions as energy storage in that the cutting disc is associated with rotational motion and mass that stores energy. This energy storage functions as a buffer which allows control of the engine by means of a control unit as described herein. Due to the time limited cutting operation which is enabled by the stored energy, the engine may adjust operating state in response to changed operating conditions. It is an advantage that the engine control need not be pro-active. It is a further advantage that the buffering effect provided by the cutting disc evens out variations in power output from the combustion engine, thus enabling a consistent power output by the cutting disc despite uneven power output from the combustion engine.

There are also disclosed herein methods and computer programs associated with the above-mentioned advantages.

BRIEF DESCRIPTION OF THE DRAWINGS

The present disclosure will now be described in more detail with reference to the appended drawings, where FIG. 1 schematically illustrates a two-stroke engine.

DETAILED DESCRIPTION

Figure 1:
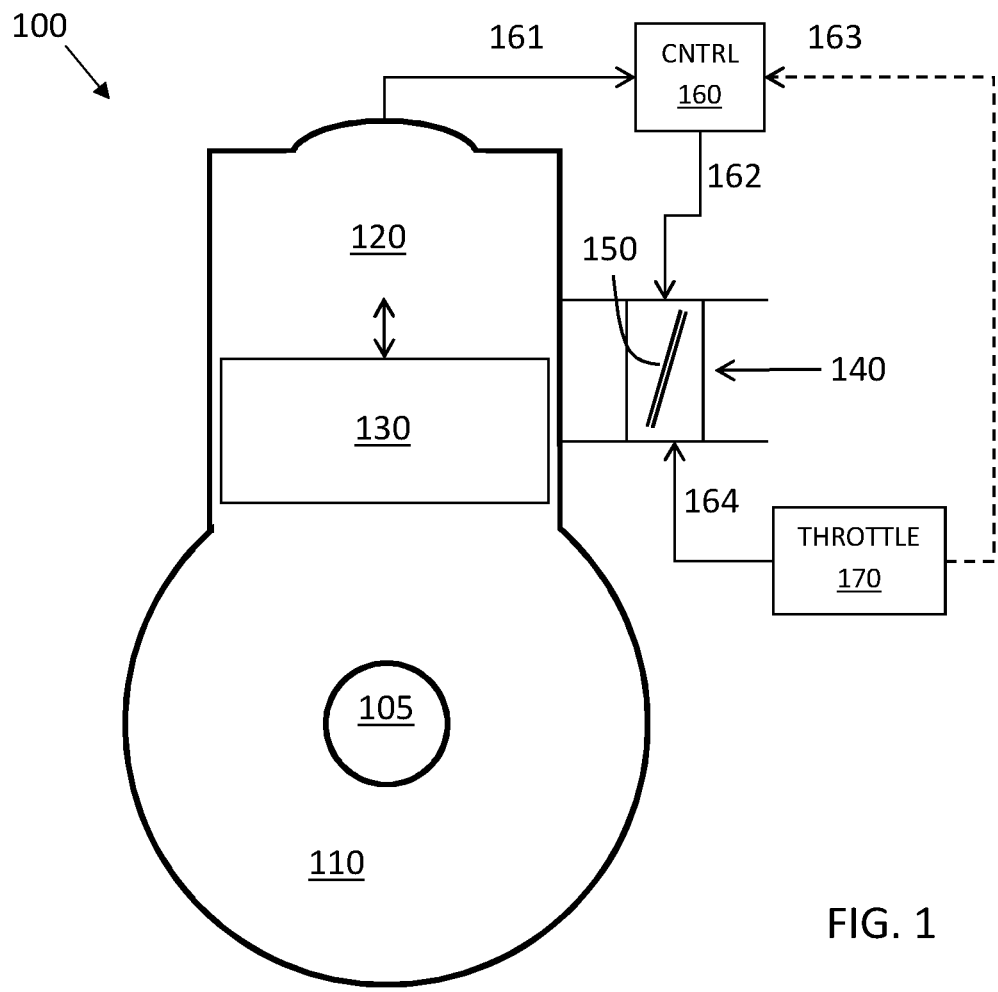

Aspects of the present disclosure will now be described more fully with reference to the accompanying drawings. The different devices, computer programs and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

FIG. 1 schematically illustrates a two-stroke engine 100. A piston 130 is arranged to reciprocate in a cylinder comprising a combustion chamber 120. A fuel/air mixture having a composition decided by a fuel setting is injected into the chamber 120 as the piston moves in an upwards direction. Just before the piston reaches its topmost position, often referred to as top dead center, the fuel/air mixture is ignited by an ignition device. The fuel/air mixture then burns, causing gas expansion, which forces the piston in a downwards direction. The linear motion of the piston 130 is transferred in a known manner to a circular motion of a crankshaft 105 arranged in a crankcase 110.

A tool, such as a cutting disc, can be powered by the combustion engine 100 via the crankshaft 105. There is often a clutch arrangement configured between the crankshaft and the tool.

Herein, inertia refers to a moment of inertia, i.e., an angular mass or rotational inertia. Inertia is measured in, e.g., kgcm$^2$.

Herein, an external load of a combustion engine refers to a load that the engine is subject to when actual work is being performed by the engine, such as a cutting operation. An external load is different from an internal load of the engine which the engine is always subject to regardless of if any work is being done. The internal load of a combustion engine comprises, e.g., load due to driving internal fans, load due to internal friction, and load due to the scavenging operation. The internal engine load often increases with engine speed, for known reasons.

Herein, arrows between units in Figures generally denote functional connections between modules, i.e., not necessarily direct physical connections, unless otherwise stated. It is appreciated that a functional connection between, e.g., an interface unit and an actuator unit may be implemented in many equivalent ways while achieving the same technical effect. For instance, a signal generated by the interface unit may be a mechanical signal directly transferred to the actuator, or it may be an electrical control signal which is received by a control unit that then controls the actuator.

The engine 100 has one or more air intakes, here schematically shown as air intake 140. The one or more air intakes allow air to flow into the engine, thus enabling combustion. The air intakes may, apart from being used for the fuel/air mixture, also be used for various boost channels, and for stratified scavenging, sometimes referred to as air-head.

Combustion engines like the two-stroke combustion engine 100 illustrated in FIG. 1 are often used in handheld power-tools where high power to weight ratios are desired. In such power-tool applications, the combustion engine is often air-cooled which can be a less effective cooling method compared to water cooling.

A two-stroke engine 100 like that illustrated in FIG. 1 has a scavenging system which is often optimized for a particular driving condition, which is an ideal driving condition. The ideal driving condition is usually associated with full engine load and wide-open throttle (WOT). When operating the engine at the ideal driving condition, the scavenging system is effective, meaning that the engine delivers high power with low emissions. Two-stroke engines are often not configured for varying driving conditions. Thus, when departing from the ideal driving condition the scavenging system ceases to be effective, which can lead to unwanted effects such as misfiring, increased emission levels, and high temperatures on engine parts such as cylinder, piston, crankcase and muffler. By running the combustion engine for extended time periods far from the ideal driving condition the engine may even break down.

During an idle mode driving condition, i.e., when the user-operated throttle is almost closed, the scavenging system will be far from optimal. However, the effects on the combustion engine from sub-optimal scavenging operation during low idle is often not very harmful due to the low engine speeds involved.

However, if the engine is partly loaded with engine speed less than racing speed and higher than clutch engagement speed, the engine suffers from sub-optimal scavenging which, due to the significant engine speeds, may result in misfire, high temperatures and even engine failure. There is a first unwanted operating zone in-between idle throttle state and WOT, where the engine operation is such that the scavenging system is not fully functional at the same time as the engine speed is sufficiently large to cause problems with, e.g., high engine temperature.

Some power tools comprise cutting discs, or cut-off wheels, and the like which are associated with large inertia. It is assumed herein that the combustion engine 100 is suitable for driving a tool associated with such significant inertia, e.g., a cutting disc having a diameter of at least 10 inches. This large inertia acts as an energy storage, in that a significant amount of energy is stored in a rapidly rotating cutting disc. This stored energy facilitates control of the combustion engine in that the energy allows for a time limited cutting operation by the cutting disc without combustion engine drive of the cutting disc. The stored energy also acts as a power buffer which smooths an uneven power input to the tool, i.e., an uneven power output from the combustion engine to provide a consistent power output from the tool.

An adjustable valve 150 is arranged to control a flow of air intake into the engine. According to some aspects, the state of the adjustable valve 150 is a binary state comprising an open state and a closed state. According to some other aspects, the state of the adjustable valve 150 comprises a continuous range of configurable air flow levels between a fully closed state and a fully open state. It is appreciated that the adjustable valve can be operated both as a binary valve and in a continuous range. For instance, the valve can be operated in a continuous range of configurable air flow levels during certain operating conditions and in a binary mode in certain other operating conditions.

The techniques disclosed herein aim at avoiding operation in an unwanted operating zone by automatically adjusting a state of the adjustable valve 150, as will be described in detail below in connection to FIGS. 4-7. The control of the adjustable valve does not significantly affect the output power from the tool due to the stored energy of the tool which acts as buffer and evens out any variation in output power from the combustion engine 100.

According to some aspects, the inertia of the tool is greater than an internal inertia of the combustion engine. It is, however, appreciated that the herein disclosed combustion engines can be used as is without a tool associated with high inertia.

The engine 100 also comprises a control unit 160 arranged to control an operation of the engine. For instance, the control unit is arranged to control a state of the adjustable valve 150 by a control signal 162. Thus, according to aspects, the adjustable valve 150 is an electrically controllable valve arranged to be controlled by a control signal 162 received from the control unit 160.

The skilled person realizes that an electrically controllable valve can be realized in many different ways while achieving the same effect. For instance, the electrically controllable valve may be realized by using an electric motor powered by a generator or battery, which motor is controlled by the control unit 160 to adjust a valve opening based on the control signal 162.

The electrically controllable valve can, according to other aspects, be implemented as a solenoid arrangement which is electrically controlled by the control unit 160. Some such examples will be discussed below in connection to FIGS. 15 and 16.

The electrically controllable valve can, according to further aspects, also be implemented as a rotating disc valve which is electrically controlled by the control unit 160.

The control unit 160 will be discussed in more detail below, in connection to, e.g., FIG. 9.

The combustion engine 100 also comprises a user-operated throttle control 170. This throttle control may for instance be a known manual throttle control which a user engages to accelerate the combustion engine 100 prior to subjecting the engine to a load. The throttle control 170 may be arranged to control 164 the same adjustable valve 150 as the control unit, or a separate valve not shown in FIG. 1, as will be discussed below with reference to FIG. 2A and FIG. 2B.

As noted above, arrows in Figures generally denote functional connections, i.e., not necessarily physical connections. For instance, FIG. 1 illustrates a connection 164, which is a throttle control signal 164, between the user-operated throttle control 170 and the adjustable valve 150, and another connection 162 between the control unit 160 and the adjustable valve 150. These functional connections may well be implemented by a single physical connection from the control unit 160 to the adjustable valve 150, and a physical connection from the user-operated throttle control 170 to the control unit 160. Thus, the control signal from the user-operated throttle control 170 may, according to some aspects, pass via the control unit 160.

The arrows 162, 164 in FIG. 1 to the adjustable valve 150 are to be interpreted as the adjustable valve being controlled jointly both by the user-operated throttle control 170 and by control algorithms implemented by the control unit 160.

The control unit may control the flow of air 140 entering the combustion engine 100 by adjusting the adjustable valve 150. The control unit 160 is arranged to receive input signals 161 from the combustion engine, from which a revolution speed of the engine can be determined. Such input signals may comprise a pulse train obtained by means of a magnet and coil arrangement mounted in connection to, e.g., a flywheel of the engine in a known manner. The input signals may optionally also comprise a status signal 163 indicating a state of the user-operated throttle control 170.

To summarize, the two-stroke combustion engine 100 illustrated in FIG. 1 comprises a user-operated throttle control 170, an adjustable valve 150 arranged to control one or more air intakes 140 of the combustion engine, and a control unit 160 arranged to control a state of the adjustable valve 150.

Figure 2A:
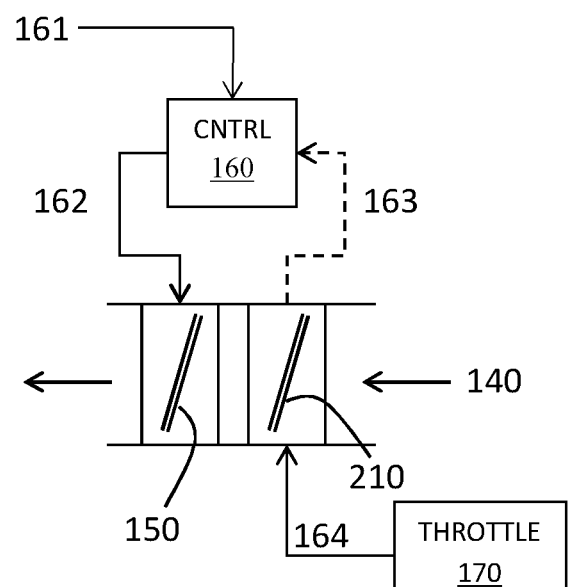
FIG. 2A illustrate two valves arranged in series.

FIG. 2A schematically illustrates an example valve arrangement with a first valve 150 and a second valve 210. The first valve 150 is an adjustable valve arranged to be controlled by a control signal 162 generated by the control unit 160. The second valve 210 is a throttle valve arranged to be controlled by a throttle control signal 164 generated based on a state of the user-operated throttle 170. As noted above, the throttle control signal 164 may physically pass via the control unit 160.

Optionally, the control unit 160 is arranged to obtain information relating to a state of the user-operated throttle valve by means of a throttle valve status signal 163.

It is appreciated that the first and the second valves shown in FIG. 2A are arranged in series and therefore together control a flow of air through the air intake 140.

Figure 2B:
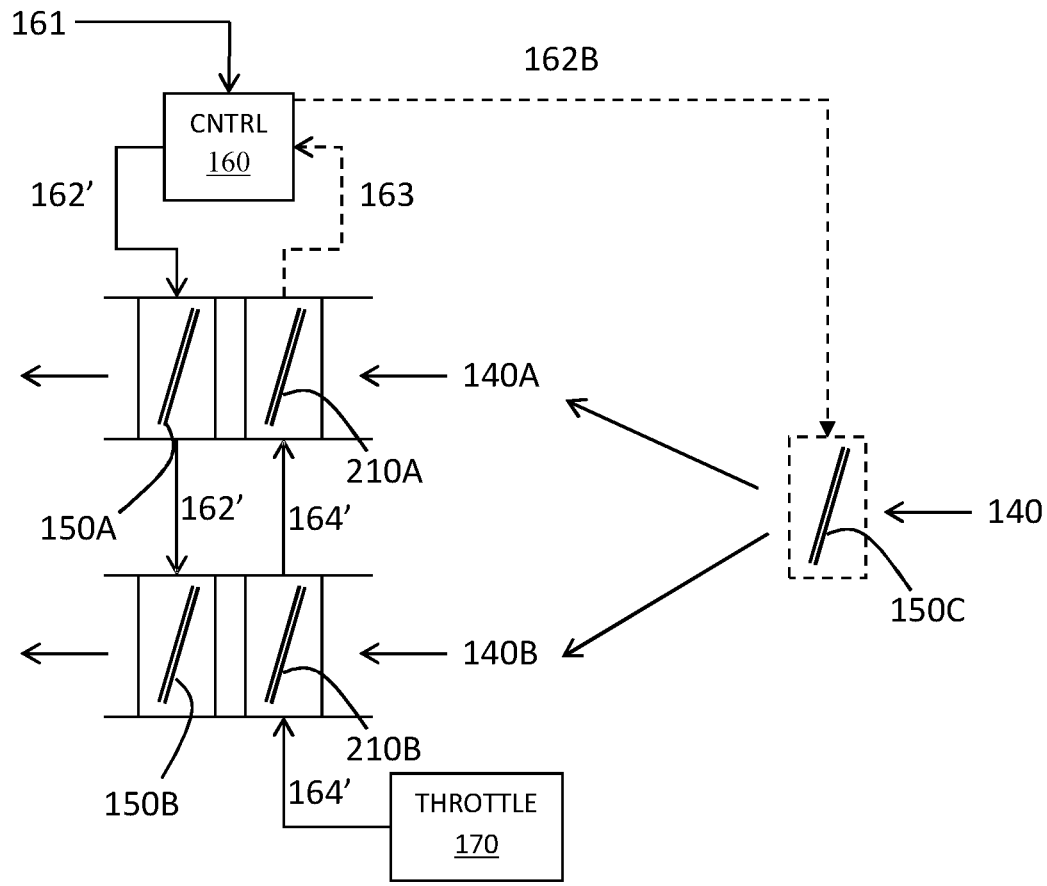
FIG. 2B illustrates a parallel valve arrangement.

FIG. 2B schematically illustrates a valve arrangement with first and second parallel valves. The first valves 150A, 150B are adjustable valves arranged to be controlled by a control signal 162' generated by the control unit 160. The second valves 210A, 210B are throttle valves arranged to be controlled by a throttle control signal 164' generated based on a state of the user-operated throttle 170.

Optionally, the control unit 160 is arranged to obtain information relating to a state of the user-operated throttle valve by means of a throttle valve status signal 163. One set of valves 150A, 210A may be used for an air/fuel mixture air intake 140A, while the other set of valves 150B, 210B may be used to control pure air intake 140B for stratified scavenging of the combustion engine 100.

According to some aspects, a third valve 150C may be arranged to control a common air intake for both air intakes based on a control signal 162B. In case the third valve is used, the valves 150A, 150B may be omitted.

It is appreciated that the valves shown in FIG. 2B are arranged in parallel and therefore together control a flow of air through the air intake 140.

Figure 15A:
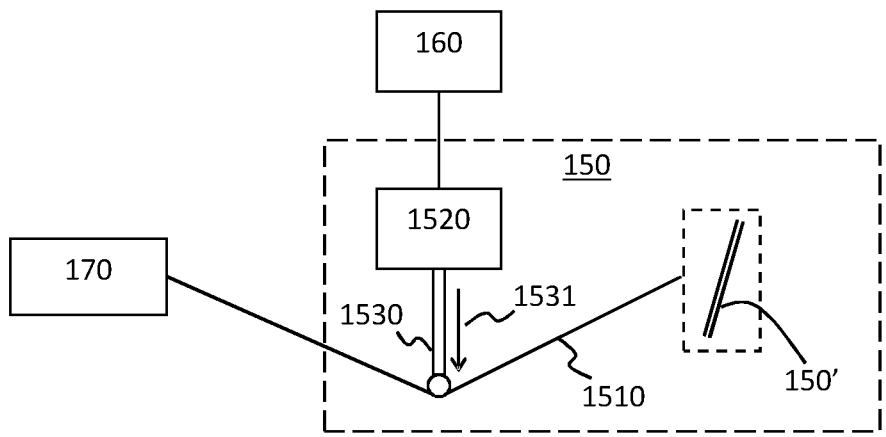
FIGS. 15A, 15B, and 16 schematically illustrate adjustable valve arrangements.
Figure 15B:
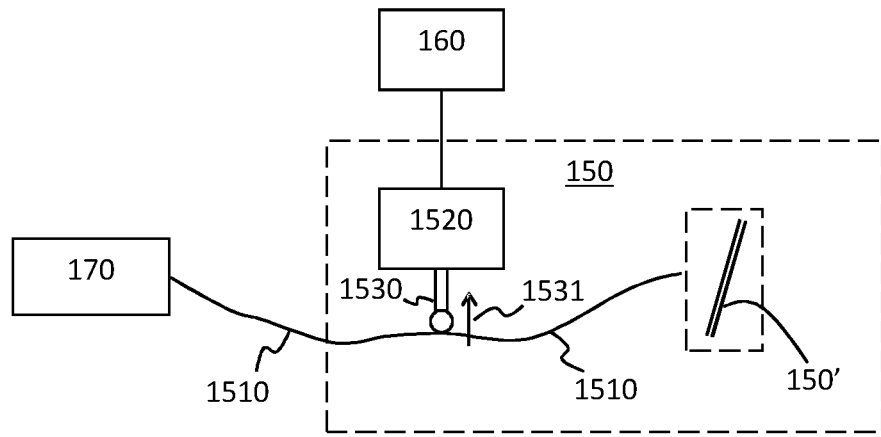

FIGS. 15A and 15B illustrate an example adjustable valve 150. This example adjustable 150 comprises a valve portion 150' that controls air flow into the combustion engine 100 in a known manner. The valve portion 150' is arranged to be controlled by the user-operated throttle control 170 via mechanical throttle linkage 1510. The throttle linkage 1510 can be, e.g., a throttle cable or wire, or it can comprise some type of control rod or other mechanical linkage part. Normally, when a user operates the throttle control 170, force is transferred from the throttle control 170 to the valve portion 150' via the throttle linkage 1510 to control air intake of the combustion engine.

The adjustable valve 150 shown in FIGS. 15A and 15B comprises a throttle linkage tensioning device 1520 configured to release tension in the throttle linkage 1510 in response to a control signal from the control unit 160, thereby reducing a current throttle level of the combustion engine. The throttle linkage tensioning device is attached to a movable arm 1530 which can be extended to tension the throttle linkage and retracted to reduce tension in the throttle linkage, as illustrated schematically in FIGS. 15A and 15B. The control unit 160 is therefore arranged to control the state of the adjustable valve 150 by controlling the throttle linkage tensioning device 1520. The movable arm is connected to the throttle linkage 1510 via a ring or wheel such that the linkage 1510 is freely movable at the connection point. This way, as long as the throttle linkage tensioning device 1520 tensions the linkage 1510, the engine operates in normal throttle control mode without influence from the throttle linkage tensioning device 1520. However, then the tension is released, the throttle is abruptly reduced down to a reduced level.

For example, in case the control unit 160 detects that the combustion engine 100 is approaching a maximum engine speed, the control unit 160 can cut the throttle by operating the linkage tensioning device to release tension in the throttle linkage 1510, thereby reducing throttle level to avoid operation at racing speed.

In other words, there is disclosed herein a two-stroke combustion engine for use with a tool associated with an inertia. The engine comprises a user-operated throttle control 170, an adjustable valve 150 arranged to control one or more air intakes 140 of the combustion engine, and a control unit 160 arranged to control a state of the adjustable valve 150. The adjustable valve 150 comprises a valve portion 150' arranged to be controlled by the user-operated throttle control 170 via throttle linkage 1510. The adjustable valve 150 also comprises a throttle linkage tensioning device 1520, 1520' configured to release tension in the throttle linkage 1510 or disengage the throttle control in response to a control signal from the control unit 160, thereby reducing current throttle level. The control unit 160 is arranged to control the state of the adjustable valve 150 to maintain combustion engine speed below a maximum engine speed level. Thus, an efficient means for avoiding combustion engine operation at racing speed is provided.

As mentioned above, the techniques disclosed herein can be used to avoid operation in any one zone or in any combination of unwanted operating zones. For instance, the control unit 160 and actuator 1520, 1530 may be designed to avoid operation by the combustion engine 100 in the first unwanted operating zone only, in the second and third unwanted operating zones only, or to avoid operation in the third operation zone only. However, preferably, the control unit 160 is designed to avoid operation in all three unwanted operating zones 410, 420, 421.

Figure 16:
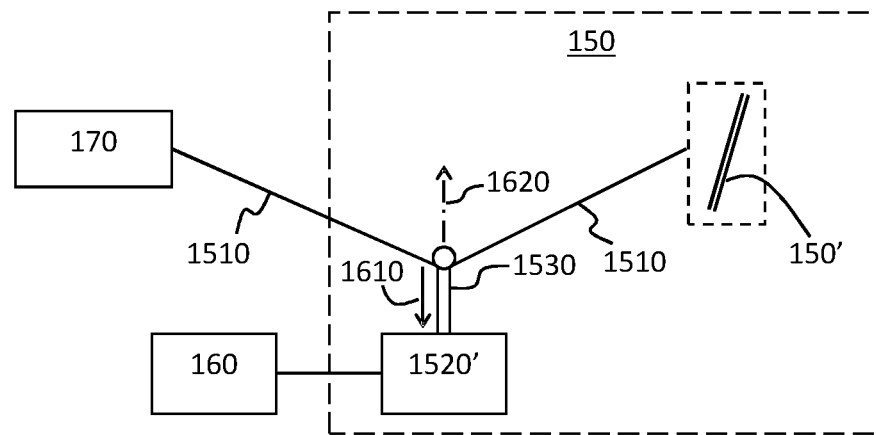

The tensioning device can be of a pull-type 1520 as shown in FIGS. 15A and 15B, or of a push-type 1520' as schematically illustrated in FIG. 16. A pull-type tensioning device is normally extended as shown in FIG. 15A and retracted in response to a control signal, as illustrated in FIG. 15B, to remove tension from the throttle linkage 1510. A push-type device works according to opposite principles, i.e., it is normally retracted as shown in FIG. 16, and extended 1620 in response to a control signal, whereby tension in the throttle linkage 1510 is reduced.

The throttle linkage tensioning device can be realized by a pull action solenoid device for the pull-type device 1520 or a push action solenoid device for the push-action device 1520'. The control unit 160 then controls the solenoid device using an electric control signal.

The throttle linkage tensioning device can also be realized by, e.g., an electric motor arranged to engage the throttle linkage via an excentre or the like.

According to some aspects, the throttle linkage tensioning device 1520, 1520' is arranged to maintain tension in the throttle linkage 1510 when in a default state, and to release tension in the throttle linkage 1510 in response to the control signal from the control unit 160.

The skilled person realizes that air intake to a combustion engine can be realized in several different ways and be controlled by valves or other control arrangements with similar effects, and that the examples given herein are by no means a complete listing of relevant valve arrangements. The teachings herein are not dependent on a particular valve arrangement but can be practiced without limitation on any type of valve arrangement which can be controlled by a control unit 160.

Figure 3:
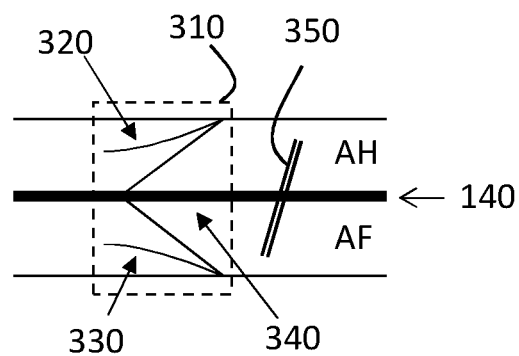
FIG. 3 shows a throttle arrangement.

FIG. 3 shows a throttle arrangement where a single air intake valve 350 is arranged to control an air intake for an air-head system (AH) of the combustion engine 100, and an air intake for an air/fuel mixture (AF) intake of the combustion engine 100. Here the valve is arranged in connection with a split-Reed arrangement 310 comprising first 320 and second 330 Reed valves arranged separated by a partition 340. The single air valve 350 is arranged to be controlled both by the user-operated throttle control 170 and by the control unit 160.

According to aspects, the adjustable valve 350 is arranged to control a pure air intake AH and an air/fuel intake AF of the engine 100.

It is again appreciated that the valve arrangement in FIG. 3 is a non-limiting example, and that the teachings herein are not dependent on any particular valve arrangement.

There are further problems associated with two-stroke engines 100 such as that illustrated in FIG. 1. One such problem relates to heat generated in a partly engaged clutch arrangement. A handheld tool with a two-stroke engine often has a starting arrangement comprising a clutch configured to engage at a clutch engagement engine speed. This way, the combustion engine can be started with minimum load, i.e., internal load only, since the tool driven by the engine is not engaged during start. Then, as the engine is started, and the engine speed increases due to, e.g., user-operated throttle engagement, the clutch arrangement connects the tool to the crankshaft, which causes the tool to start rotating. The tool can then be used for, e.g., cutting into an object. When the tool is used for cutting, the need of power can vary due to, e.g., different materials to be cut, or different levels of pressure exerted on the tool. If the need for power from the engine is higher than the maximum amount of power the engine can deliver at WOT, the engine speed will drop. If the user does not reduce engine load, the engine speed will go down to low speed and may partly disengage the clutch. This operating condition may be harmful in that a significant amount of heat is generated in the partly disengaged clutch, which may damage the clutch arrangement or other engine parts. Consequently, there is a second unwanted operating zone in a vicinity where the clutch is partly engaged.

The techniques disclosed herein also aim at avoiding operation in the second unwanted operating zone where the clutch is partly engaged by automatically adjusting the state of the adjustable valve 150, as will be described in detail below in connection to FIG. 8.

Another problem relates to increased emission levels due to engine speed limitation by ignition cutting. If the need for power from the engine is less than what is delivered at WOT, then the engine speed will increase as long as the user-operated throttle is fully or at least significantly engaged. Such increases in engine speed may lead to engine speeds above a maximum configured engine speed. Most combustion engine systems are equipped with speed limiting arrangements to counter combustion engine racing. A known such speed limiting arrangement is to cut engine ignition when the engine speed passes the maximum engine speed. However, when cutting ignitions an increased amount of unburnt fuel will exit the combustion engine together with the exhaust. This means that emission levels increase, which is undesirable. Such speed limitation based on ignition cutting is unwanted due to the increased emission levels. Consequently, a third unwanted operating zone is defined by engine operation above a maximum engine speed.

The techniques disclosed herein furthermore aim at avoiding speed limitation by ignition cutting, by instead automatically adjusting the state of the adjustable valve 150, as will be described in detail below.

Figure 4:
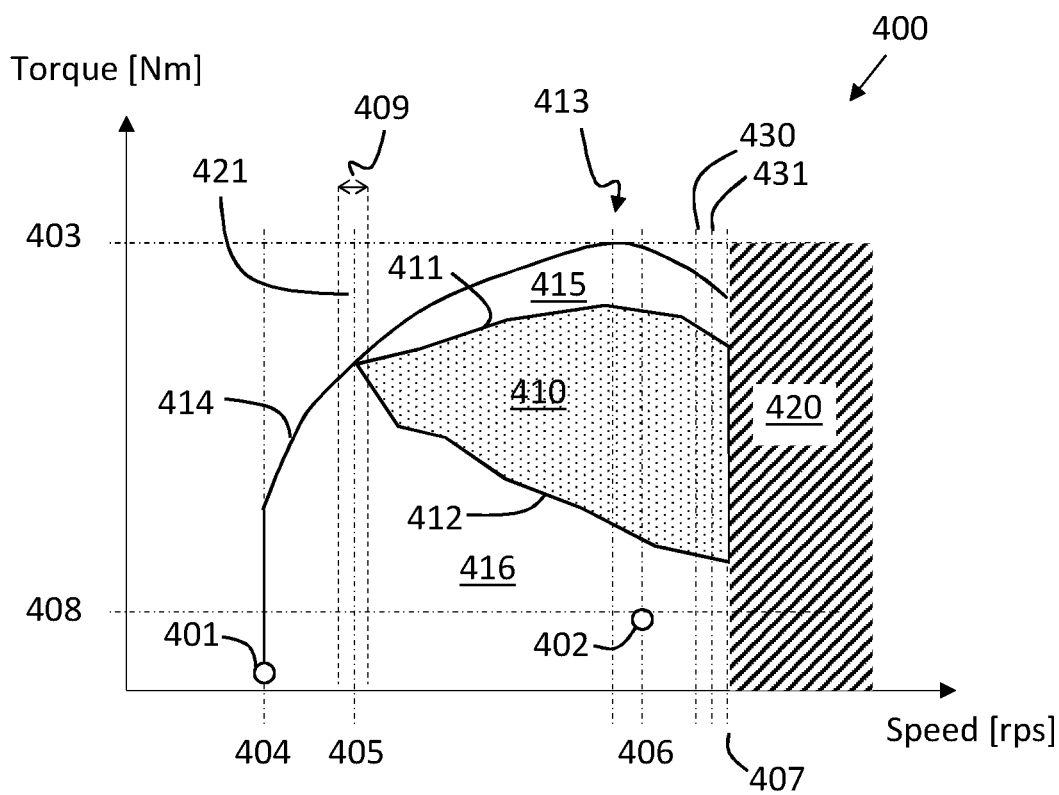
FIG. 4 is a graph illustrating engine torque as function of engine speed.

FIG. 4 is a graph 400 illustrating engine torque 414 in Newton-meters (Nm) as function of engine speed in revolutions per second (rps). When the engine is not subject to an engaged throttle control, the engine operates in a first idle mode 401 at an idle engine speed 404. As mentioned above, this first idle mode is associated with a sub-optimal scavenging operation of the engine. However, due to the low engine speed the likelihood of overheating and misfire is low.

When the throttle is engaged to accelerate the engine 100, the torque 414 increases with increasing engine speed. There is a clutch engagement engine speed 405 where the clutch arrangement engages and connects a tool, such as a cutting disc, to the engine crankshaft to power the tool. Often, there is an engine speed span 409 where the clutch arrangement is partly engaged. This region, as mentioned above, is a second unwanted operating zone 421 in that a partly engaged clutch is likely to generate heat and mechanical wear which may damage the clutch or other engine parts. After clutch engagement, the engine torque continues to increase up to a maximum engine torque level 403 at a speed 413 of the combustion engine associated with the maximum engine torque. It is appreciated that this maximum engine torque level does not necessarily coincide with maximum engine power. After the maximum torque engine speed 413, the torque falls with further increasing engine speeds.

Due to, e.g., safety reasons and reasons related to mechanical integrity, there is a maximum engine speed 407 defined, below which the engine speed is to be kept at all times. Above the maximum engine speed is an operating zone 420 where it is not safe to operate the engine. This operating zone is therefore an unwanted operating zone, it is referred to herein as the third unwanted operating zone 420.

As discussed above, there is a first unwanted operating zone 410 delimited by an upper torque limit 411 and a lower torque limit 412 as function of engine speed. In this region the scavenging system of the engine is not operating properly, which means that the engine may be subject to overheating, misfires, and increased emission levels. Above this first unwanted operating zone, i.e., in area 415, the scavenging system operation of the combustion engine 100 is satisfactory, meaning that the risk of overheating, misfires, and high emission levels is low. Below the first unwanted operating zone 410, i.e., in area 416, the scavenging operation of the combustion engine 100 is not operating properly. However, due to the low engine speeds and torque levels involved, the negative effects of the poor scavenging are not too severe.

Herein, the terminology unwanted operating zone is used generally when discussing an unwanted combustion engine state. It is appreciated that there are different unwanted operating zones 421, 410, 420. A first unwanted operating zone 410 is delimited by the upper torque limit 411 and the lower torque limit 412 as function of engine speed, and by the maximum engine speed 407. A second unwanted operating zone 421 is located in a vicinity of engine speed span 409 where the clutch arrangement is partly engaged. A third unwanted operating zone 420 is defined by engine speeds above the maximum engine speed 407.

It is appreciated that the techniques disclosed herein can be used to avoid operation in any one zone or in any combination of unwanted operating zones. For instance, a control unit 160 may be designed to avoid operation by the combustion engine 100 in the first unwanted operating zone only, in the second and third unwanted operating zones only, or to avoid operation in the third operation zone only. However, preferably, the control unit 160 is designed to avoid operation in all three unwanted operating zones 410, 420, 421.

For a two-stroke engine such as the engine 100 illustrated in FIG. 1, torque and air flow into the engine are closely connected. A high air flow into the engine results in high torque, and a low air flow into the engine results in low torque. Consequently, a torque graph such as that shown in FIG. 4 closely resembles a graph of air intake valve state as function of engine speed. In other words, torque, valve state, and engine speed are mathematically related.

According to some aspects, the air intake valve is a throttle valve of the combustion engine 100.

According to some aspects, the adjustable valve is a throttle valve of the combustion engine 100.

According to some aspects, the combustion engine 100 is a stratified charged combustion engine, which has air intakes for an air/fuel mixture and for pure air used for the stratified charging, sometimes referred to as air-head. The air intake valves referred to herein may then be both the air/fuel mixture valve and the air head valve or be just the throttle valve used to control air/fuel mixture.

In some example implementations, the control unit 160 is arranged to control the state of an adjustable throttle valve. The throttle valve in turn may be linked to an air-head valve via, e.g., a lost-motion connection. Thus, the air-head valve is indirectly controlled by the control unit, in that the control unit controls a state of the throttle valve, which then controls a state of the air-head valve via mechanical linkage. However, in this case, as mentioned above, a functional connection clearly exists between control unit 160 and air-head valve.

Figure 5:
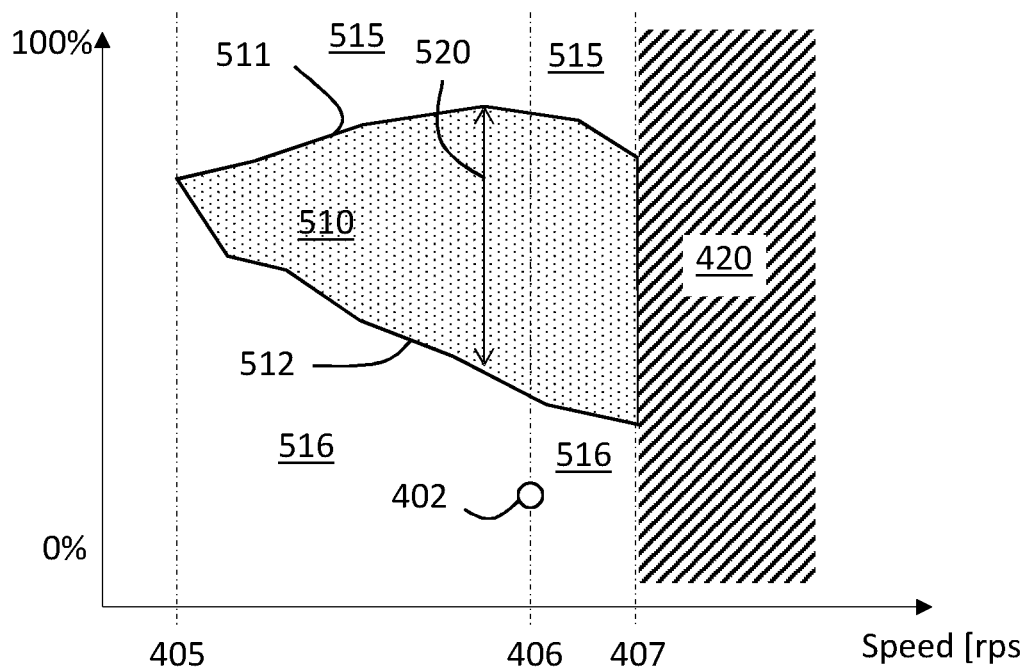
FIGS. 5-6 are graphs showing valve state as function of engine speed.
Figure 6:
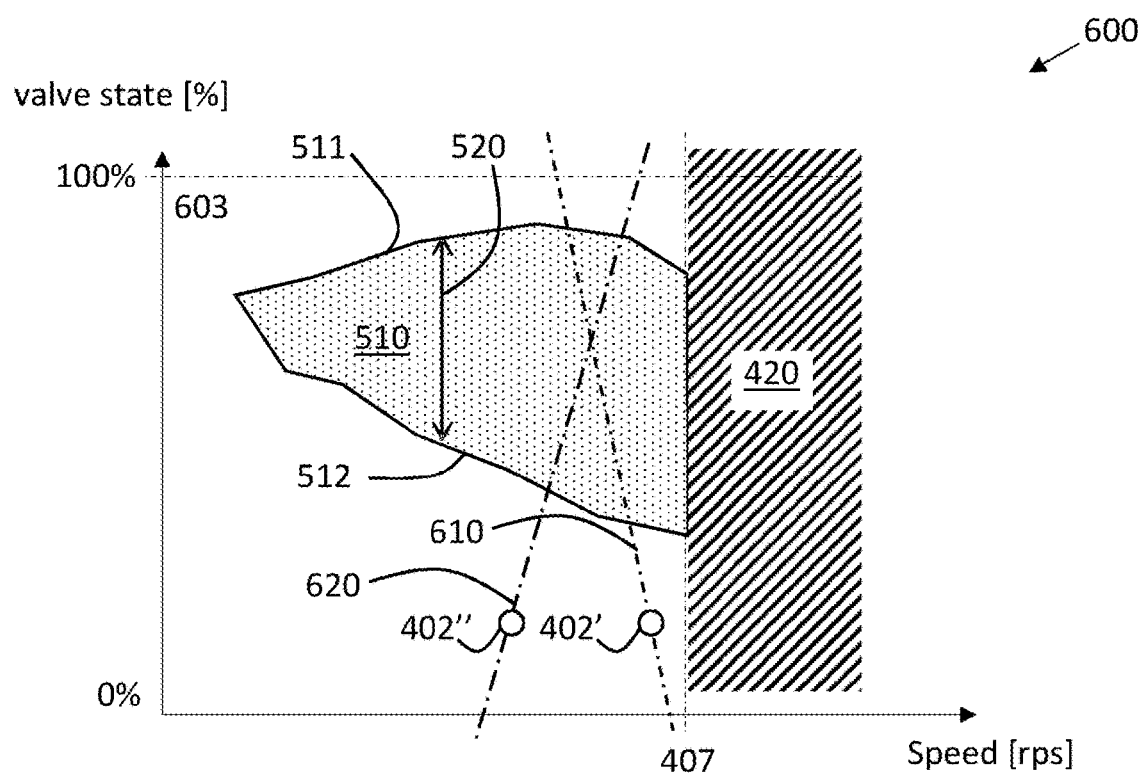
Figure 8:
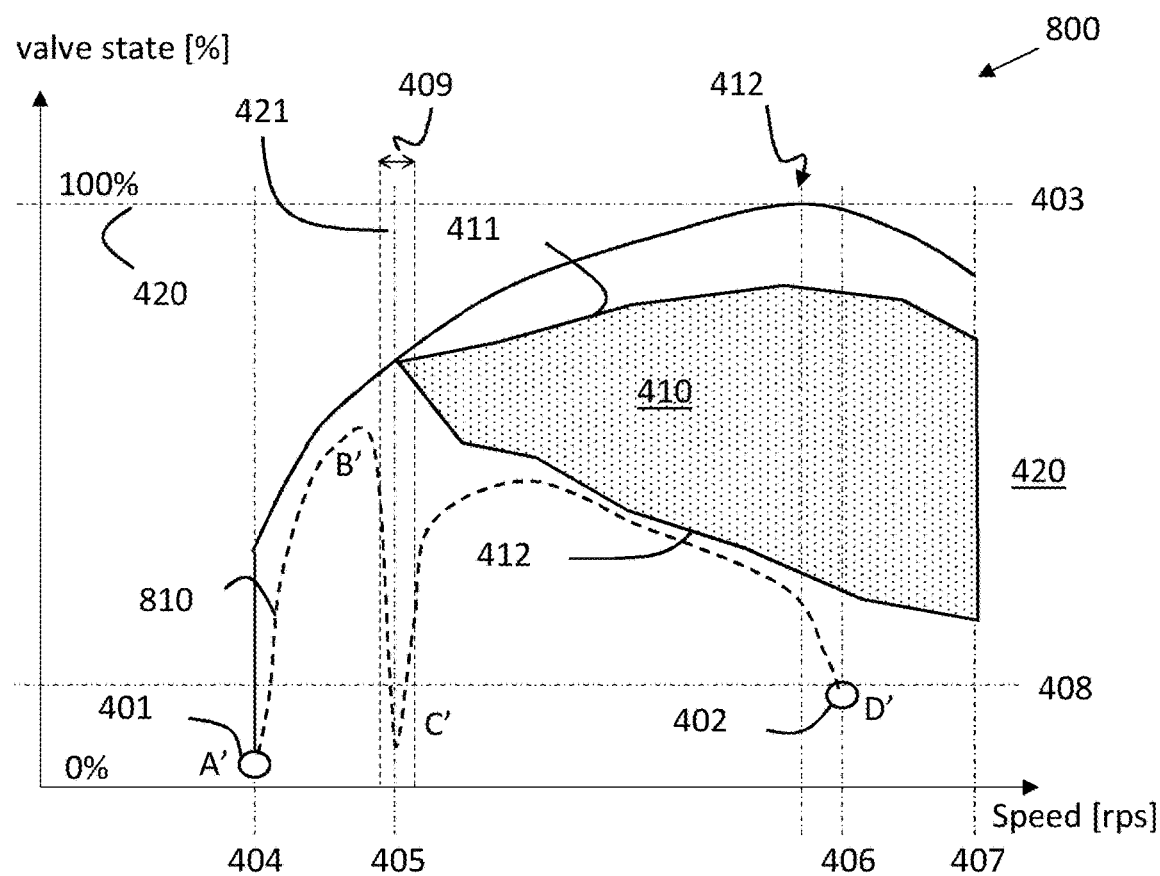
FIG. 8 is a graph showing valve state as function of engine speed.

FIGS. 5-6, and 8 are graphs showing valve state in percent as function of engine speed measured in rps and correspond to the graph shown in FIG. 4. A higher valve state percentage means that the valve is more open, giving more torque, while a lower percentage means that the valve is more closed, giving less torque. It is noted that the graphs of valve state are almost identical to the graph showing torque in FIG. 4, this is not always the case. In fact, the two different types of graphs may differ significantly.

According to some aspects, a valve state of 100% equals a fully open valve, and a valve state of 0% equals a fully closed valve. The valve state is proportional to an air flow through the engine measured in liters/sec. It is appreciated that the valve state may comprise an aggregated valve state indicating a flow of air through several separate valves arranged in combination.

FIG. 5 shows that the first unwanted operating zone 410 in FIG. 4 corresponds to a similarly shaped first unwanted operating zone in terms of intake air valve states 510, delimited by an upper limit 511 and by a lower limit 512, since torque, valve state, and engine speed are related. Thus, for each engine speed, there is a range of adjustable valve states 520 to be avoided. These ranges 520 of adjustable valve states to be avoided correspond to operating conditions of the engine where sub-optimal scavenging is likely to cause problems. Operation of the engine outside of these ranges of valve states is preferred, either because the scavenging system is effective, as is the case in area 515, or because of low torque and/or engine speeds which permit operating the engine with sub-optimal scavenging, as is the case in area 516. It is an object of the present disclosure to provide combustion engines, power tools, and methods which enable operation mostly outside unwanted operating zones such as the first unwanted operating zone 510.

The effect of using a tool with a large inertia is further illustrated and discussed below in connection to FIG. 11. Due to the buffering effect discussed previously, a control unit 160 may control the adjustable valve in response to variations in combustion engine speed or load, as opposed to pro-actively controlling the adjustable valve. For instance, the control unit may control the adjustable valve to avoid operation outside of the first unwanted operating zone 510, since the inertia of the cutting disc allows control of the adjustable valve 150 in response to changes in engine speed. Also, the control unit 160 may control the adjustable valve between a fully open and a fully closed state, which uneven power output from the combustion engine is then smoothed out by the buffering effect of the tool which still can deliver an even cutting power.

Due to the stored energy, the combustion engine 100 may be configured with a second idle mode 402, associated with sufficient engine speed to allow for a time limited cutting operation without full engine drive. The control unit 160 can maintain operation in the second idle mode, which can be viewed as a stand-by mode, until a user subjects the engine to external load, whereupon the control unit can respond by opening the adjustable valve to provide an increased output power from the combustion engine. This response is necessarily associated with some delay, but this delay is compensated for by the stored energy.

According to aspects, the combustion engine 100 is arranged to operate in the second idle mode 402 when the engine is not subject to an external load below an idle load threshold 408, wherein the idle load threshold is configured below 50% of a maximum engine load.

The first idle mode 401 corresponds to a conventional idle mode of the combustion engine 100. In this idle mode the engine speed is well below the clutch engagement engine speed 405. The first idle mode operating point is well outside the unwanted operating zone 410.

When the user engages the user-operated throttle control 170, the engine accelerates. However, instead of accelerating up to the maximum engine speed limit 407 where speed limitation mechanism prevents further acceleration by, e.g., ignition cutting, the disclosed combustion engine 100 adjusts the state of the adjustable valve 150, by the control unit, to operate in the second idle mode 402. This second idle mode 402 is also well outside of the first unwanted operating zone 410, but now a significant amount of energy is stored as a consequence of the combustion engine operating at the target engine speed. When a user applies a load to the engine, e.g., by starting a cutting operation, the stored energy allows for a time limited cutting operation. The increased engine load will cause the engine speed to drop below the target engine speed 406. However, due to the stored energy this drop will be relatively slow, allowing the control unit to adjust the state of the adjustable valve to increase air intake into the engine in order to maintain operation at the target engine speed. This will be described more in detail later with reference to FIG. 7.

According to aspects, the target engine speed 406 lies between a configured maximum engine speed 407 and a speed of the combustion engine associated with maximum engine torque 413.

It is appreciated that a starting mode of the engine 100 used to start combustion process, is not referred to as an idle mode herein.

Techniques involving cutting of ignition in order to avoid an engine racing condition can optionally be used as a complement to the techniques disclosed here. It is appreciated that ignition control and control of the adjustable valve can be performed in parallel.

To summarize, there is disclosed herein a two-stroke combustion engine 100 comprising a user-operated throttle control 170, an adjustable valve 150 arranged to control one or more air intakes 140 of the combustion engine, and a control unit 160 arranged to control a state of the adjustable valve 150. The combustion engine 100 is arranged to operate in a first idle mode 401 at an idle engine speed 404 below a clutch engagement engine speed 405 when the user-operated throttle control 170 is not engaged. The combustion engine 100 is also arranged to operate in a second idle mode 402 at a target engine speed 406 above the clutch engagement engine speed 405 when the user-operated throttle control 170 is engaged and when the engine is not subject to an external load. The control unit 160 is arranged to control the state of the adjustable valve 150 to maintain engine speed at the target engine speed 406 when the engine 100 operates in the second idle mode 402.

According to aspects, the control unit 160 is arranged to determine an unwanted operating zone, such as a first unwanted operating zone 510, comprising a range of adjustable valve states 520 in dependence of an engine speed value, and to control the state of the adjustable valve 150 to be outside of the unwanted operating zone.

The first unwanted operating zone 510 is illustrated in, e.g., FIG. 5. Operation in this region can be harmful to the combustion engine.

According to aspects, the control unit 160 is arranged to determine the unwanted operating zone 510 based on engine torque resulting from a combination of engine speed value and engine throttle angle, wherein the unwanted operating zone corresponds to sub-optimal engine scavenging operation.

According to aspects, the two-stroke combustion engine 100 comprises one or more throttle state sensors and an engine speed sensor. The control unit 160 is arranged to determine a current operating point of the engine 100 in relation to the unwanted operating zone 510 based on one or more throttle state input signals from the one or more throttle state sensors, and on an engine speed signal from the engine speed sensor.

The throttle state sensor may, e.g., be a based on a Hall sensor or similar. The throttle state sensor may also comprise a potentiometer or the like.

It is appreciated that the control unit 160 may also determine the state of the throttle valve or valves based on what control signals that have been submitted. Thus, the state of the throttle valve is determined without need for a throttle state sensor. For instance, suppose a valve starts in a fully closed state, whereupon a control signal is issued that opens the valve by 20% relative to WOT. It can then be deduced that the valve state is about 20% of WOT.

The engine speed sensor may be based on an ignition timing value, or on an electric pulse train generated by a magnet and coil arranged in connection to a flywheel of the combustion engine in a known manner.

According to aspects, the control unit 160 is arranged to control the state of the adjustable valve 150 by increasing an opening of the adjustable valve 150 by a first amount if the engine speed is below the target engine speed 406, and by decreasing an opening of the adjustable valve 150 by a second amount if the engine speed is above the target engine speed 406. The first and the second amounts are determined to control the state of the adjustable valve 150 to be outside of the unwanted operating zone.

According to aspects, a magnitude of the first amount and/or a magnitude of the second amount is determined in dependence of a rate of change in engine speed.

This way the combustion engine response will be faster if the speed change is fast, and somewhat slower for a slower speed change.

According to aspects, the control unit 160 is arranged to determine the unwanted operating zone 510 in dependence of a temperature value of the combustion engine 100.

When the combustion engine is running hot, for instance due to operation in high ambient temperature conditions, or if the engine cooling system for some reason is not very effective, the unwanted operating zone 510 can be enlarged to account for the smaller margins in engine temperature. On the other hand, if the engine is not so hot, for instance due to just being started or due to low ambient temperatures, then the unwanted operating zone can be made smaller, since there are larger margins with respect to combustion engine overheating.

According to aspects, the control unit 160 is arranged to determine the unwanted operating zone 510 in dependence of a current load of the combustion engine 100.

At high loads the engine may be more prone to overheating, which means that unwanted operating zones may change.

According to aspects, the control unit 160 is arranged to determine the unwanted operating zone 510 in dependence of a user profile associated with the combustion engine 100.

Some users may be more aggressive than other users when operating the combustion engine, or when operating a power tool comprising the combustion engine. Such varying user characteristics can be accounted for when determining the unwanted operating zone. For instance, if the user is known to be aggressive, then additional margins may be enforced when determining unwanted operating zone 510. On the other hand, if a cautious and more careful user is operating the combustion engine, then a smaller unwanted operating zone may be determined with smaller margins to, e.g., overheating and the like.

FIG. 6 is a graph showing valve state in percent as a function of engine speed measured in rps. According to this example the target engine speed is not a vertical line but varies with the state of the adjustable valve 150. In other words, according to aspects, the target engine speed 610 is a function of the state of the adjustable valve 150. For instance, it may be advantageous to shift the second idle mode 402' to higher engine speeds in order to store more energy when operating in the second idle mode 402. Then, as the engine is loaded due to, e.g., a cutting operation, the target engine speed may be reduced to, e.g., an engine speed associated with maximum engine torque. According to another example, it may be desired to reduce the engine speed when operating at the second idle mode 402" in order to reduce, e.g., noise and fuel consumption. Then, as the user applies load to the engine and the adjustable valve state is adapted to account for the increased load, it may be desired to increase target speed 620 in order to improve tool performance.

According to aspects, the target engine speed 610 is a function of a type of cut-off disc mounted. For instance, a heavy tool, such as a large diameter cut-off wheel, 10 inches or more in diameter, will store more energy than a lighter weight tool at the same engine speed, or tool rotation speed. By accounting for the type of tool the combustion engine is used to drive, a consistent amount of stored energy can be obtained. This may improve a user experience in that a more consistent experience is obtained when different cutting tools are used.

According to some aspects, the control unit 160 is arranged to control the state of the adjustable valve 150 in dependence of a state of the user-operated throttle control 170. It is appreciated that an air intake to the combustion engine can be controlled by one or more valves, as illustrated in FIGS. 2 and 3 above. Of course, in case the user-operated throttle control is arranged to control one valve and the control unit is arranged to control another valve arranged, then the state of the user-operated throttle control must be accounted for when adjusting the state of the adjustable valve.

Also, in some cases it may be desired to not allow a throttle level above that of the user-operated throttle control.

Furthermore, according to some aspects, the combustion engine 100 is arranged to operate in the second idle mode 402 at a target engine speed 406 above the clutch engagement engine speed 405 when the user-operated throttle control 170 is significantly engaged and when the engine is not subject to an external load. Here, significantly engaged means that the throttle is not just slightly engaged. For instance, a user-operated throttle control level of 20% of WOT may be a significant engagement level. According to another example, a user-operated throttle control level close to 100% of WOT may be a significant engagement level.

According to some aspects, the user-operated throttle control level corresponding to the significant engagement level is configurable by a user, or pre-configured.

According to aspects, the control unit 160 is arranged to determine the unwanted operating zone, such as the first unwanted operating zone 510, comprising the range of adjustable valve states 520 in dependence of a sensor input signal related to an operating condition of the two-stroke combustion engine 100. The sensor input signal may, e.g., be a temperature sensor or a misfire detection sensor such as a microphone-based sensor. The control unit may then start out with an initial pre-configured unwanted operating zone, and then gradually re-fine the unwanted operating zone based on the sensor input signals. For instance, in case misfires are detected at a certain operating point outside a current unwanted operating zone, then the unwanted operating zone should be expanded to comprise the operating point where misfire was detected by the sensors. Similarly, the unwanted operating zone may initially be large, and then gradually reduced until misfire or high temperature is detected.

Examples of sensor input signals comprise any of an engine misfire sensor, a microphone, a vibration sensor, and an ignition timing sensor.

According to aspects, the control unit 160 is arranged to regularly update the unwanted operating zone 510. Thus, as mentioned above, the unwanted operating zone is adapted to the current operating conditions of the combustion engine and optionally to the characteristics of the current user.

As mentioned above, operation of the combustion engine above a maximum engine speed is not desired since operating at such high speeds may pose a risk to the user and may also be harmful to the combustion engine. Known methods of limiting engine speeds to speeds below a maximum engine speed comprises ignition cutting. However, such methods imply an increased amount of emission in that unburnt fuel is pushed from the combustion chamber 120 during the exhaust cycle. The control unit and adjustable valve arrangement disclosed herein can also be used to limit engine speed to speeds below a maximum engine speed 407. This way operation inside of area 420, i.e., the third unwanted operating zone 420, is avoided. This is achieved by closing the adjustable valve when the combustion engine approaches the maximum engine speed 407, while still avoiding operation outside of the first unwanted operating zone 510.

According to aspects, the control unit is arranged to control the state of the adjustable valve 150 to limit engine speed to speeds below a configured maximum engine speed 407.

Figure 7:
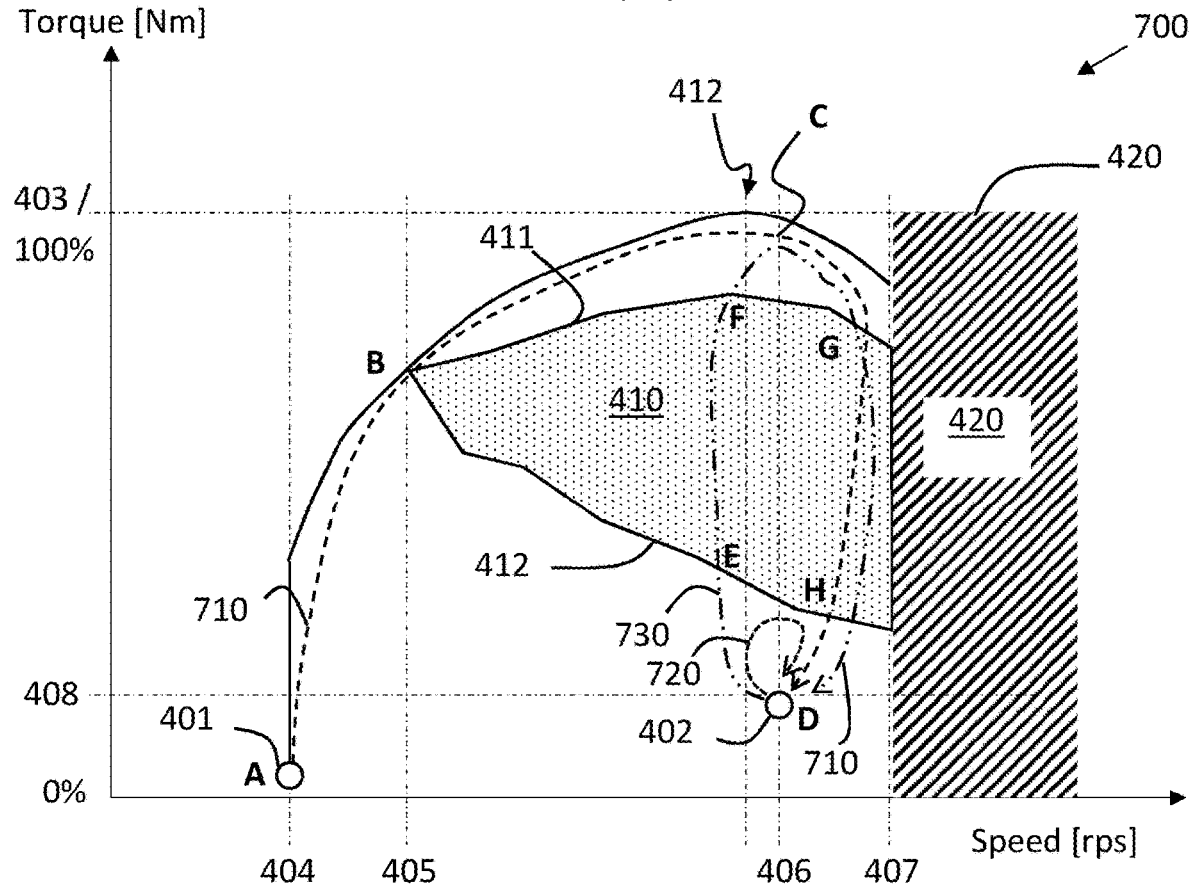
FIG. 7 is a graph illustrating engine torque as function of engine speed.

FIG. 7 illustrates torque 700 in Nm as function of engine speed in rps, i.e., like in FIG. 4. FIG. 4 provides example operations of the disclosed combustion engine 100 and illustrates how the unwanted operating zone 410 is avoided by adjusting the adjustable valve 150 by the control unit 160. Suppose the combustion engine is started in the first idle mode 401, at an operating point labelled as A in FIG. 7. The user first engages the user-operated throttle control which causes the combustion engine to accelerate 710. The control unit 160 determines that the engine speed is below the target engine speed 406 and therefore opens up the adjustable valve to allow more air to flow into the combustion engine. At operating point B, the clutch engagement speed 405 has been reached at which an external tool is connected to the combustion engine. This external tool may rotate at the engine speed, or it may rotate at some other speed in case a gearbox or similar arrangement is used together with the combustion engine 100. In this example the user does not apply load to the combustion engine 100, which means that acceleration continues, at operating point C, past the target engine speed 406. The control unit now detects that the target engine speed has been exceeded, and therefore proceeds to close the adjustable valve 150. This closing of the adjustable valve reduces engine acceleration and also torque since the amount of air flowing into the engine is reduced. At operating point G, the control unit determines that the combustion engine is about to enter the first unwanted operating zone, i.e., that the operating point is on or in vicinity of the upper limit 411 of the unwanted operating zone. This detection can be performed, e.g., by monitoring a combination of valve state and engine speed. The control unit therefore closes the adjustable valve by an amount sufficient to move the operating point to operating point H, which is on, or close to, the lower limit 412 of the unwanted operating zone 410. The control unit then proceeds to control the adjustable valve to reach the target engine speed 406.

If the combustion engine is not subjected to an external load, then the combustion engine will maintain operation at the second idle mode 402. In this second idle mode, the combustion engine is in stand-by to be subjected to external load as discussed above.

Suppose now that the combustion engine 100 operates in the second idle mode 402, i.e., the user has engaged the user-controlled throttle, but has not applied any significant load to the combustion engine. Due to the operation at the target engine speed, an amount of energy is stored in the rotation of the engine and the tool. This energy is sufficient to power the tool for a limited time duration. In case the user applies a small load to the tool, then the engine speed will decrease 720, and the control unit 160 will adjust the opening of the adjustable valve to accelerate the combustion engine back to the target engine speed 406, and, if the small load is removed then operation at the second idle mode 402 will continue.

If, however, the user applies a larger load to the combustion engine 100, then the engine speed will decrease more rapidly 730 since more energy is taken out of the rotating tool without re-supply from the combustion engine. The control unit 160 will detect the decrease in engine speed and open the adjustable valve to accelerate the engine back to target speed 406. However, this opening of the valve will bring the engine to operating point E which is on or close to the lower limit 412 of the unwanted operating zone 410. The control unit 160 will therefore open up the adjustable valve to bring the combustion engine to the upper limit 411 of the first unwanted operating zone 410, i.e., at operating point F.

Now, in case of a partial engine load with partly closed throttle, the control unit will execute loops between operating points E, F, G and H. This way the combustion engine never operates, or at least never operates for an extended period of time, inside the first unwanted operating zone. However, due to the buffering effect of the tool connected to the engine, the output power from the tool is maintained at a stable level despite the variations in output power by the combustion engine which is looping between operating points E, F, G and H. This buffering effect is discussed in more detail below in connection to FIG. 11.

FIG. 8 illustrates a graph of valve state in percent as function of engine speed in rps. Here, an improved clutch operation is illustrated. The combustion engine starts in the first idle mode 401, denoted as operating point A'. The user then engages the user-operated throttle control, whereupon the combustion engine accelerates towards the clutch engagement speed 405. However, in a vicinity 409 of the clutch engagement speed 405, the control unit 160 at B' temporarily reduces the opening of the adjustable valve in order to reduce engine torque. This reduction in torque allows the clutch arrangement to engage before the control unit again opens, at C', the adjustable valve to reach the target engine speed. This reduction in engine torque during clutch engagement reduces wear on the clutch.

In other words, according to aspects, the control unit 160 is arranged to control the state of the adjustable valve 150 by temporarily decreasing the opening of the adjustable valve 150 by a third amount when the combustion engine 100 accelerates past the clutch engagement engine speed 405, thereby allowing a clutch operation of the two-stroke combustion engine to complete at a temporarily reduced engine torque.

To summarize, FIGS. 4-8 illustrate operations by a two-stroke combustion engine 100 for use with a tool associated with an inertia, comprising a user-operated throttle control 170, an adjustable valve 150 arranged to control an air intake of the combustion engine 100, and a control unit 160 arranged to control a state of the adjustable valve. The control unit 160 is arranged to determine at least one unwanted operating zone comprising a range of adjustable valve states, or engine torque values, in dependence of an engine speed value, wherein the control unit is arranged to apply a first engine control method when the engine operates in the unwanted operating zone, and to apply a second engine control method different from the first engine control method when the engine operates outside the unwanted operating zone.

The second engine control method may be a method aimed at maintaining a target engine speed 406, while the first engine control method may be a method aimed at avoiding operation in the unwanted operating zone by increasing or decreasing combustion engine torque.

The second engine control method may also correspond to a conventional engine control method aimed at maximizing a tool performance, while the first engine control method may be a control method focused on bringing the combustion engine out of the unwanted operating zone.

Figure 9:
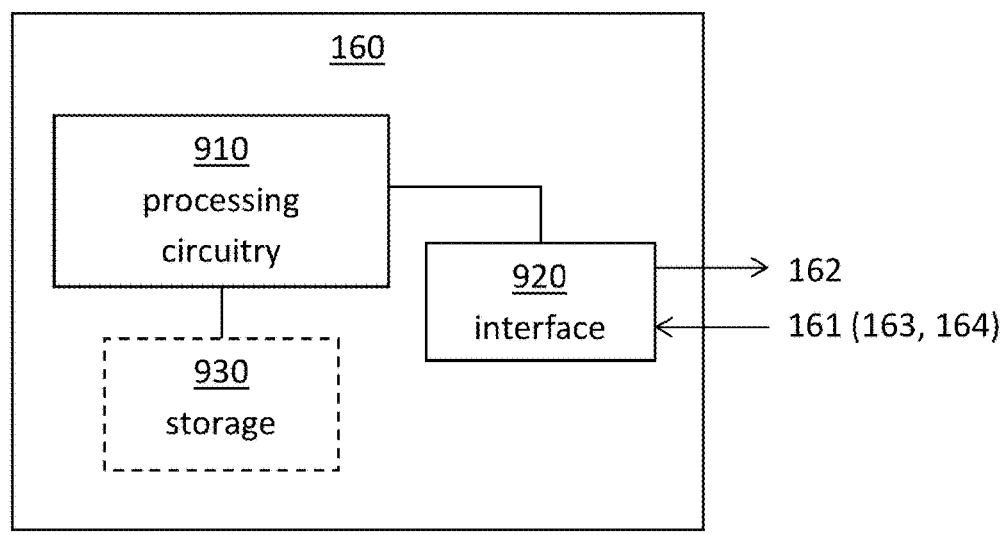
FIG. 9 schematically illustrates a control unit.

FIG. 9 schematically illustrates an example of a control unit 160. The control unit 160 comprises processing circuitry 910 and an interface module 920 for communications with at least one external port and/or sensor device. As such the interface module 920 may comprise one or more transmitters and receivers, comprising analogue and digital components and a suitable number ports for wireline or wireless communication. The control unit 160 is arranged to receive the input signals 161 from the combustion engine via the interface module 920, and to output the control signal 162 for adjusting the adjustable valve 150. The input signals may optionally also comprise the status signal 163 indicating the state of the user-operated throttle control 170. As mentioned above, the input signals may also comprise a physical signal from the user-operated throttle control 170.

The processing circuitry 910 is provided using any combination of one or more of a suitable central processing unit CPU, multiprocessor, microcontroller, digital signal processor DSP, etc., capable of executing software instructions stored in a computer program product, e.g. in the form of a storage medium 930. The processing circuitry 910 may further be provided as at least one application specific integrated circuit ASIC, or field programmable gate array FPGA, or programmable integrated circuit PIC.

Particularly, the processing circuitry 910 is configured to cause the control unit 160 to perform a set of operations, or steps. For example, the storage medium 930 may store the set of operations, and the processing circuitry 910 may be configured to retrieve the set of operations from the storage medium 930 to cause the control unit 160 to perform the set of operations. The set of operations may be provided as a set of executable instructions. Thus, the processing circuitry 910 is thereby arranged to execute methods as herein disclosed, such as the methods discussed below in connection to FIGS. 13 and 14.

The storage medium 930 may also comprise persistent storage, which, for example, can be any single one or combination of magnetic memory, optical memory, solid state memory or even remotely mounted memory.

The processing circuitry 910 controls the general operation of the control unit 160 e.g. by sending data and control signals to the interface module 920 and the storage medium 930, by receiving data and reports from the interface module 920, and by retrieving data and instructions from the storage medium 930. Other components, as well as the related functionality, of the control unit 160 are omitted in order not to obscure the concepts presented herein.

Figure 10:
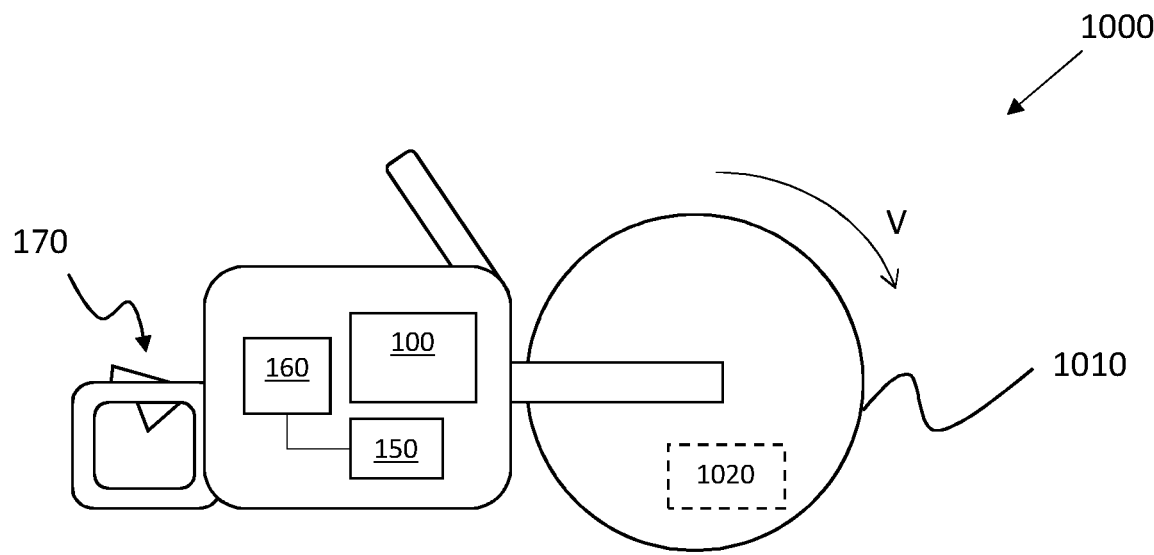
FIG. 10 schematically illustrates a power tool.

FIG. 10 schematically illustrates a power tool 1000 comprising a combustion engine 100 according to the above discussion, with a control unit 160, an adjustable valve 150, and a user-operated throttle control 170. The combustion engine 100 is arranged to power a cutting disc 1010, wherein an inertia of the cutting disc exceeds an internal inertia of the combustion engine 100, thereby allowing a time limited cutting operation by the cutting disc starting from a state corresponding to the target engine speed without combustion engine drive.

Cutting tools like the cutting disc 1010 are generally associated with a maximum speed of rotation, or a specified maximum cut-off wheel speed. This maximum cut-off wheel speed, according to aspects, at least in part determines the maximum engine speed 407. Operation above the maximum cut-off wheel speed can at least partly guaranteed by use of the herein disclosed techniques.

FIG. 10 also illustrates a power tool 1000 comprising a cutting disc 1010 and a two-stroke combustion engine 100 arranged to power the cutting disc. The two-stroke combustion engine comprises a user-operated throttle control 170, an adjustable valve 150 arranged to control an air intake of the combustion engine 100, and a control unit 160 arranged to control a state of the adjustable valve. The power tool 1000 is arranged to use an inertia of the cutting disc as energy storage, whereby the energy storage allows a time limited cutting operation without combustion engine drive of the cutting disc, thereby allowing control of the adjustable valve in response to variations in combustion engine speed or load.

According to some aspects, the power tool 1000 comprises input means, such as a keypad or touch-screen, or wireless input means configured to communicate with, e.g., a smartphone, laptop, or similar, whereby a user can input configuration data such as the maximum engine speed 407 and other configuration parameters, manually or automatically. The user may optionally also input a type of cutting disc used, whereupon the control unit 160 automatically configures the maximum engine speed 407 from the stored data.

According to aspects, the control unit 160 is arranged to control the state of the adjustable valve 150 into a closed state of the adjustable valve if engine speed goes above a first limit engine speed 430, and to cut ignition of the combustion engine 100 when engine speed goes above a second limit speed 431 larger than the first limit speed and smaller than the maximum engine speed 407, such that engine speeds above the maximum engine speed 407 is avoided.

This way ignition cut is often avoided, while operation above the engine maximum speed 407 is avoided. This operation therefore reduces emissions, while effectively limiting engine speed to speeds below the maximum engine speed 407.

According to aspects, the control unit 160 is arranged to control the state of the adjustable valve 150 to maintain a target engine speed 406. This way of operation was discussed above and exemplified in connection to FIG. 7.

According to aspects, the control unit 160 is arranged to determine an unwanted operating zone 510 comprising a range of adjustable valve states 520 in dependence of an engine speed value, and to control the state of the adjustable valve 150 to be outside of the unwanted operating zone. The unwanted operating zone, and its determining, was also discussed above.

According to aspects, the control unit 160 is arranged to control the state of the adjustable valve 150 by toggling between an open state of the adjustable valve and a closed state of the adjustable valve to avoid operation in the unwanted zone. This type of binary control of the adjustable vale results in an uneven power output from the combustion engine. However, due to the buffering effect in the cutting disc 1010, this uneven power input is smoothed.

As mentioned above, herein, inertia refers to a moment of inertia, i.e., an angular mass or rotational inertia. Inertia is measured in, e.g., $kgcm^2$.

According to some aspects, the inertia of the cutting disc 1010 is larger than an internal inertia of the combustion engine 100. Thus, according to an example, the inertia of the cutting disc 1010 is larger than 45 $kgcm^2$. According to another example, the inertia of the cutting disc 1010 is larger than 50 $kgcm^2$. These values of inertia are large enough in order for the cutting disc to act as energy storage according to the principles discussed above.

According to some aspects, the internal inertia of the combustion engine is substantially determined by an inertia associated with a flywheel of the combustion engine 100.

According to aspects, a diameter of the cutting disc 1010 is at least 10 inches. A 10 inch cutting disc provides sufficient energy storage to allow operation without engine drive for a limited amount of time as discussed above.

According to aspects, the cutting disc 1010 is an abrasive or a super-abrasive cutting disc.

According to some aspects, the control unit 160 is arranged to control the state of the adjustable valve to avoid operation of the combustion engine 100 at engine speed above a maximum engine speed 407.

According to some aspects, the cutting disc 1010 comprises a data storage device 1020, such as a chip or radio frequency identification device which can be read remotely by the control unit 160. The control unit 160 is arranged to read data from the data storage device. The data storage device being configured to store any of; a cutting disc diameter of the cutting disc 1010, a measure of inertia of the cutting disc 1010, a type specification of the cutting disc 1010, and a maximum speed of rotation associated with the cutting disc 1010. This way, the control unit may configure parameters of operation depending on the type of cutting tool used. For instance, the maximum engine speed 407 can be configured based on a maximum rotation speed of the attached cutting tool.

According to some aspects, the control unit 160 is arranged to verify data read from the data storage device 1020 against a pre-configured specification, and to control the adjustable valve based on if the data read from the data storage device 1020 matches the pre-configured specification.

As an example, the cutting tool 1010 attached to the power tool 1000 may not have enough inertia to allow operation according to the principles described herein. The control unit may then inactivate control of the electrically controllable valve to only perform a subset of functions, or to not control flow at all. For instance, if the cutting disc is too small, or weighs to little, then the control unit 160 may only use the adjustable valve 150 to limit engine speeds to engine speeds below the maximum engine speed 407.

FIG. 10 also schematically illustrates a two-stroke combustion engine 100 comprising a user-operated throttle control 170, an adjustable valve 150 arranged to control an air intake of the combustion engine 100, and a control unit 160 arranged to control a state of the adjustable valve. The control unit 160 is arranged to determine an unwanted operating zone 510 comprising a range of adjustable valve states 520 in dependence of an engine speed value, wherein the control unit is arranged to apply a first engine control method when the engine operates in the unwanted operating zone, and to apply a second engine control method different from the first engine control method when the engine operates outside the unwanted operating zone.

For instance, the second engine control method may correspond to a conventional engine control method aimed at maximizing a tool performance, while the first engine control method may be a control method focused on bringing the combustion engine out of the unwanted operating zone.

Figure 11:
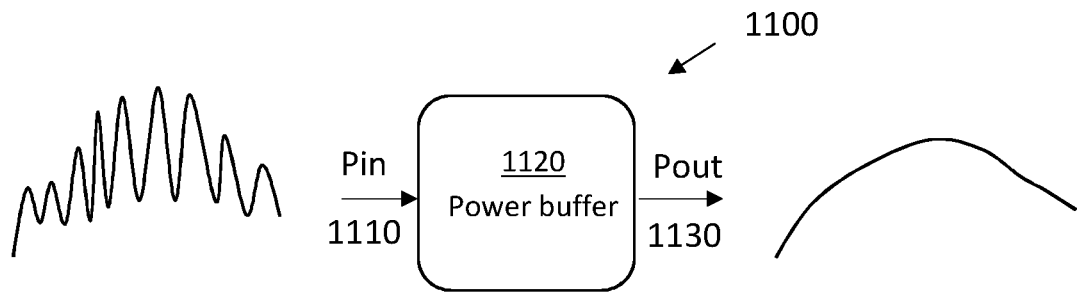
FIG. 11 schematically illustrates a power tool principle.

FIG. 11 illustrates a principle of operation according to the present teaching. As discussed above, a rotating tool can be used as energy storage which permits a time limited cutting operation without combustion engine drive. The cutting tool therefore has a buffering effect which evens out varying energy input from a power source such as the combustion engine. This way, an intermittent energy input 1110 is evened out by the buffer 1120 and enables an even and consistent power outtake 1130 from the system. This way the combustion engine output power or torque can be varied over a large range without significant effect on the consistency of output power of the tool.

Figure 12:
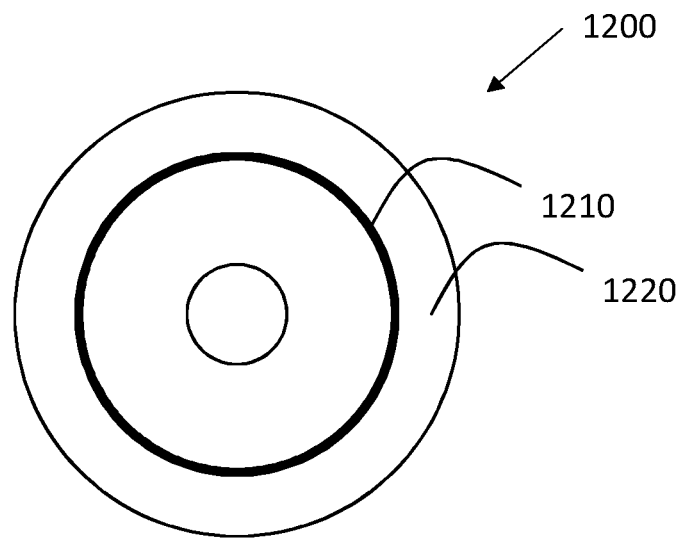
FIG. 12 schematically illustrates a computer program product.

FIG. 12 schematically illustrates a computer program product 1200. Thus, there is disclosed herein a computer program product 1200 comprising a computer program 1210 according to the above discussions, and a computer readable means 1220 on which the computer program is stored. The computer program 1210 comprises computer program code which, when executed in a control unit 160, causes the control unit 160 to execute a method according to the present disclosure.

Figure 13:
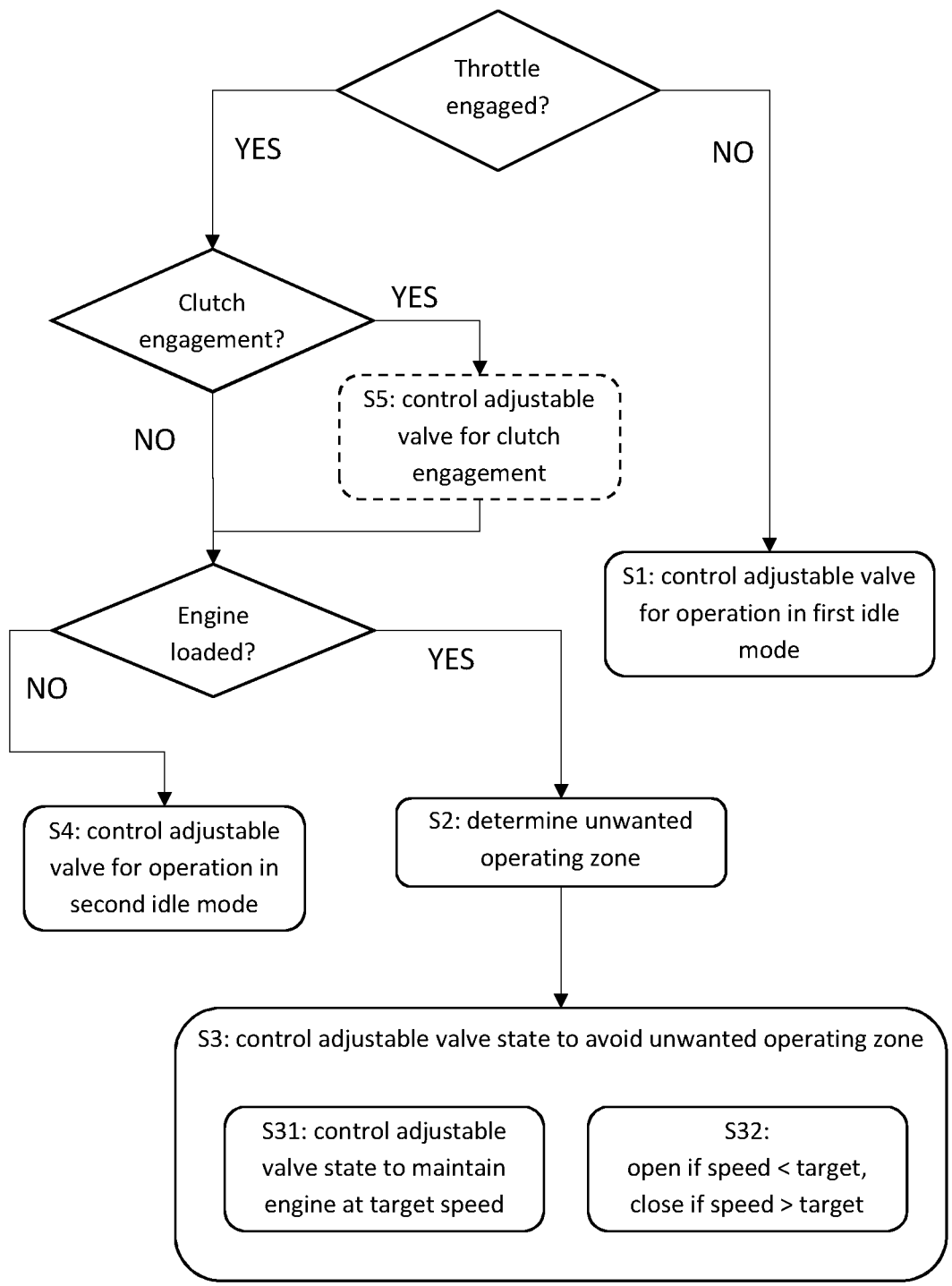
FIGS. 13-14 are flow charts illustrating methods.
Figure 14:
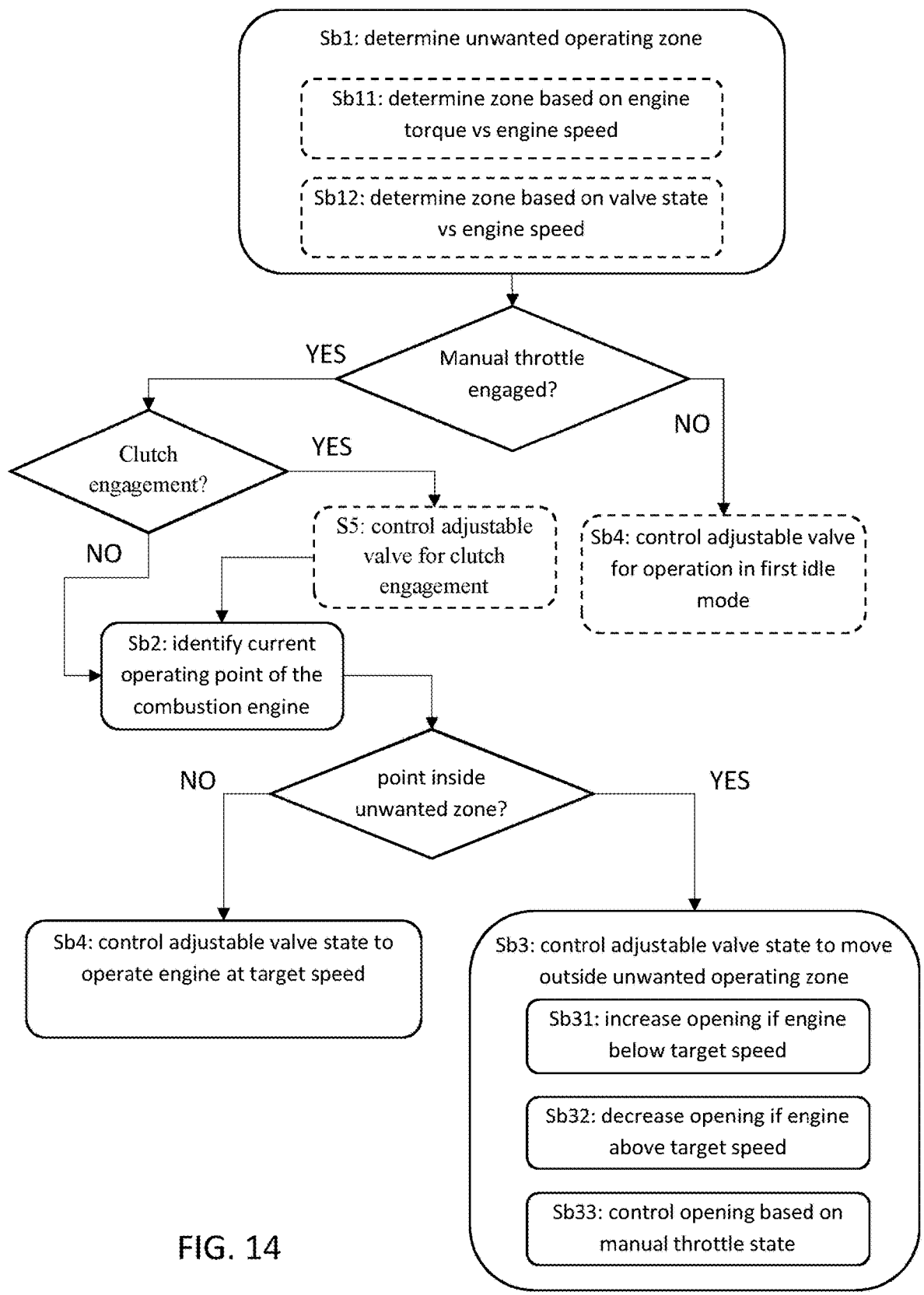

FIGS. 13-14 are flow charts illustrating methods. The methods describe operations performed by aspects of the above discussed combustion engines and power tools.

FIG. 13 illustrates a method for controlling combustion in a two-stroke engine 100 by a control unit 160, the two-stroke engine comprising a user-operated throttle control 170, and an adjustable valve 150 configured to control an air intake 140 of the combustion engine. The method comprises controlling S1 a state of the adjustable valve 150 to operate the engine in a first idle mode 401 at an idle engine speed 404 below a clutch engagement engine speed 405 when the user-operated throttle control 170 is not engaged, and controlling S4 the state of the adjustable valve 150 to operate the engine in in a second idle mode 402 at a target engine speed 406 above the clutch engagement engine speed 405 when the user-operated throttle control 170 is engaged and when the engine is not subject to an external load.

According to aspects, the method comprises determining S2 an unwanted operating zone 510 comprising a range of adjustable valve states 520 in dependence of engine speed value and controlling S3 the state of the adjustable valve 150 to be outside of the unwanted operating zone.

According to aspects, the method comprises controlling S31 the state of the adjustable valve 150 to operate the engine at a target engine speed 406 above the clutch engagement engine speed 405 when the user-operated throttle control 170 is engaged.

According to aspects, the method comprises controlling S32 the state of the adjustable valve 150 by increasing an opening of the adjustable valve 150 by a first amount if the engine speed is below the target engine speed 406, and by decreasing an opening of the adjustable valve 150 by a second amount if the engine speed is above the target engine speed 406.

According to aspects, the method comprises controlling S5 the state of the adjustable valve 150 by temporarily decreasing the opening of the adjustable valve 150 by a third amount if the combustion engine 100 accelerates past the clutch engagement engine speed 405, thereby allowing a clutch operation of the two-stroke combustion engine to complete at a temporarily reduced engine torque.

FIG. 14 illustrates a method for controlling combustion in a two-stroke engine 100 by a control unit 160, the two-stroke engine comprising a user-operated throttle control 170, and an adjustable valve 150 configured to control an air intake 140 of the combustion engine. The method comprises determining Sb1 an unwanted operating zone 510 comprising a range of engine torque values or adjustable valve states 520 in dependence of engine speed value, and while the user-operated throttle control 170 is engaged:

identifying Sb2 a current operating point of the combustion engine comprising a current engine torque value or adjustable valve state and a current engine speed value, and, if the current operating point is inside the unwanted operating zone, controlling Sb3 a state of the adjustable valve 150 to move the current operating point outside the unwanted operating zone, and if the current operating point is outside the unwanted operating zone, controlling Sb4 the state of the adjustable valve 150 to operate the engine at a target engine speed 406 above the clutch engagement engine speed 405.

According to aspects, the method comprises controlling Sb3, if the current operating point is inside the unwanted operating zone, increasing Sb31 an opening of the adjustable valve 150 by a first amount if the engine speed is below the target engine speed 406, and decreasing Sb32 an opening of the adjustable valve 150 by a second amount if the engine speed is above the target engine speed 406, wherein the first and second amounts are determined to force the current operating point outside of the unwanted operating zone.

The invention claimed is:

1. A power tool comprising a two-stroke combustion engine, the combustion engine comprising:
   a user-operated throttle control;
   an adjustable valve arranged to control one or more air intakes of the combustion engine; and
   a control unit arranged to control a state of the adjustable valve,
   wherein the combustion engine is arranged to operate in a first idle mode at an idle engine speed below a clutch engagement engine speed when the user-operated throttle control is not engaged,
wherein the combustion engine is arranged to operate in a second idle mode at a target engine speed above the clutch engagement engine speed when the user-operated throttle control is engaged and when the engine is not subject to an external load, and
wherein the control unit is arranged to control the state of the adjustable valve to maintain engine speed at the target engine speed when the engine operates in the second idle mode.

2. The power tool according to claim 1, wherein the combustion engine is arranged to power a cutting disc, and
wherein an inertia of the cutting disc exceeds an internal inertia of the combustion engine, thereby allowing a time limited cutting operation by the cutting disc starting from a state corresponding to the target engine speed without combustion engine drive.

3. A power tool comprising:
a cutting disc associated with an inertia; and
a two-stroke combustion engine arranged to power the cutting disc, the two-stroke combustion engine comprising a user-operated throttle control, an adjustable valve arranged to control an air intake of the combustion engine, and a control unit arranged to control a state of the adjustable valve,
wherein the power tool is arranged to use an inertia of the cutting disc as energy storage, whereby the energy storage allows a time limited cutting operation without combustion engine drive of the cutting disc, thereby allowing control of the adjustable valve in response to variations in combustion engine speed or load.

4. The power tool according to claim 3, wherein the control unit is arranged to control the state of the adjustable valve to maintain a target engine speed.

5. The power tool according to claim 3, wherein the control unit is arranged to determine an unwanted operating zone comprising a range of adjustable valve states in dependence of an engine speed value, and to control the state of the adjustable valve to be outside of the unwanted operating zone.

6. The power tool according to claim 5, wherein the control unit is arranged to control the state of the adjustable valve by toggling between an open state of the adjustable valve and a closed state of the adjustable valve to avoid operation in an unwanted zone.

7. The power tool according to claim 6, wherein the closed state of the adjustable valve is a completely closed valve state, or a substantially closed state configured to block or to substantially block a flow through the adjustable valve.

8. The power tool according to claim 3, wherein the inertia of the cutting disc is larger than an internal inertia of the combustion engine, or larger than 45 kgcm$^2$.

9. The power tool according to claim 8, wherein the internal inertia of the combustion engine is substantially determined by an inertia associated with a flywheel of the combustion engine.

10. The power tool according to claim 3, wherein the control unit is arranged to control the state of the adjustable valve to avoid operation of the combustion engine at an engine speed above a maximum engine speed.

11. The power tool according to claim 3, wherein the cutting disc comprises a data storage device, and wherein the control unit is arranged to read data from the data storage device, the data storage device being configured to store any of a cutting disc diameter of the cutting disc, a measure of inertia of the cutting disc, a type specification of the cutting disc, and a maximum speed of rotation associated with the cutting disc.

12. The power tool according to claim 11, wherein the control unit is arranged to verify data read from the data storage device against a pre-configured specification, and to control the adjustable valve based on if the data read from the data storage device matches the pre-configured specification.

13. The power tool according to claim 3, wherein a diameter of the cutting disc is at least 10 inches.

14. The power tool according to claim 3, wherein the cutting disc is an abrasive or a super-abrasive cutting disc.

15. The power tool (according to claim 3, wherein the control unit is arranged to control the state of the adjustable valve into a closed state of the adjustable valve if engine speed goes above a first limit engine speed, and to cut ignition of the combustion engine when engine speed goes above a second limit speed above the first limit speed and below the maximum engine speed, such that engine speeds above the maximum engine speed is avoided.

16. A method for controlling combustion in a two-stroke engine by a control unit, the two-stroke engine comprising a user-operated throttle control, and an adjustable valve configured to control an air intake of the combustion engine, the method comprising:
controlling a state of the adjustable valve to operate the engine in a first idle mode at an idle engine speed below a clutch engagement engine speed when the user-operated throttle control is not engaged, and
controlling the state of the adjustable valve to operate the engine in in a second idle mode at a target engine speed above the clutch engagement engine speed when the user-operated throttle control is engaged and when the engine is not subject to an external load.

17. The method according to claim 16, further comprising:
determining an unwanted operating zone comprising a range of adjustable valve states in dependence of engine speed value, and
controlling the state of the adjustable valve to be outside of the unwanted operating zone.

18. The method according to claim 17, further comprising controlling the state of the adjustable valve to operate the engine at a target engine speed above the clutch engagement engine speed when the user-operated throttle control is engaged.

19. The method according to claim 16, further comprising controlling the state of the adjustable valve by increasing an opening of the adjustable valve by a first amount if the engine speed is below the target engine speed, and by decreasing an opening of the adjustable valve by a second amount if the engine speed is above the target engine speed.

20. The method according to claim 16, further comprising controlling the state of the adjustable valve by temporarily decreasing the opening of the adjustable valve by a third amount if the combustion engine accelerates past the clutch engagement engine speed, thereby allowing a clutch operation of the two-stroke combustion engine to complete at a temporarily reduced engine torque.

21. A two-stroke combustion engine for use with a tool associated with an inertia, the combustion engine comprising:
a user-operated throttle control;
an adjustable valve arranged to control one or more air intakes of the combustion engine; and a control unit arranged to control a state of the adjustable valve, wherein the combustion engine is arranged to operate in a first idle mode at an idle engine speed below a clutch engagement engine speed when the user-operated throttle control is not engaged, wherein the combustion engine is arranged to operate in a second idle mode at a target engine speed above the clutch engagement engine speed when the user-operated throttle control is engaged and when the engine is not subject to an external load, and wherein the control unit is arranged to control the state of the adjustable valve to maintain engine speed at the target engine speed when the engine operates in the second idle mode.

22. The two-stroke combustion engine according to claim 21, wherein the control unit is arranged to determine an unwanted operating zone comprising a range of adjustable valve states in dependence of an engine speed value, and to control the state of the adjustable valve to be outside of the unwanted operating zone.

23. The two-stroke combustion engine according to claim 21, wherein the user-operated throttle control and the control unit are arranged to control the same adjustable valve, or wherein the user-operated throttle control is arranged to control a throttle valve arranged separate from the adjustable valve.

24. The two-stroke combustion engine according to claim 21, wherein the control unit is arranged to control the state of the adjustable valve to limit engine speed to speeds below a configured maximum engine speed.

25. The two-stroke combustion engine according to claim 23, wherein the adjustable valve comprises a valve portion arranged to be controlled by the user-operated throttle control via a throttle linkage, the adjustable valve comprising a throttle linkage tensioning device configured to release tension in the throttle linkage in response to a control signal from the control unit, whereby the control unit is arranged to control the state of the adjustable valve by controlling the throttle linkage tensioning device.

* * * * *